(12) United States Patent
Pan et al.

(10) Patent No.: US 11,665,709 B1
(45) Date of Patent: May 30, 2023

(54) METHOD AND APPARATUS FOR SUPPORTING SIDELINK RELAY ADAPTATION LAYER FOR UE-TO-NETWORK RELAY IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 18/091,076

(22) Filed: Dec. 29, 2022

Related U.S. Application Data

(60) Provisional application No. 63/319,857, filed on Mar. 15, 2022.

(51) Int. Cl.
*H04W 72/25* (2023.01)
*H04W 76/27* (2018.01)

(52) U.S. Cl.
CPC ........... *H04W 72/25* (2023.01); *H04W 76/27* (2018.02)

(58) Field of Classification Search
CPC ..... H04W 52/02; H04W 72/20; H04W 72/25; H04W 76/10; H04W 76/27
See application file for complete search history.

(56) References Cited

U.S. PATENT DOCUMENTS

2023/0073469 A1* 3/2023 Wang ................ H04W 72/1263

OTHER PUBLICATIONS

"3rd Generation Partnership Project; Technical Specification Group Radio Access Network; NR; Sidelink Relay Adaptation Protocol (SRAP) Specification (Release 17)," 3GPP TS 38.351 V0.4.0 (Feb. 2022), 3rd Generation Partnership Project (3GPP), pp. 1-21, Feb. 2022 (Year: 2022).*
"3GPP Portal; Specification #: 38.351," 3rd Generation Partnership Project (3GPP), https://portal.3gpp.org/desktopmodules/Specifications/SpecificationDetails.aspx?specificationId=3897, accessed Mar. 21, 2023, p. 1 (Year: 2023).*

* cited by examiner

*Primary Examiner* — Thomas R Cairns
(74) *Attorney, Agent, or Firm* — Blue Capital Law Firm, P.C.

(57) ABSTRACT

A method and device are disclosed for Sidelink Relay Adaptation Protocol (SRAP) Data Protocol Data Unit (PDU) discarding. In one embodiment, the method includes a relay UE establishing a PC5 connection with a remote UE. The method further includes the relay UE receiving a SRAP Data PDU from the remote UE. The method also includes the relay UE preventing from discarding the SRAP Data PDU if the SRAP Data PDU is the first SRAP Data PDU received from the remote UE via SL-RLC1, wherein a header of the first SRAP Data PDU contains a UE Identity/Identifier (ID) of the remote UE, and the UE ID of the remote UE is not included in any SRAP configuration of the relay UE.

12 Claims, 20 Drawing Sheets

| Bit | Description |
|-----|-------------|
| 0 | SRAP Data PDU |
| 1 | SRAP Control PDU (not used in this release) |

METHOD AND APPARATUS FOR SUPPORTING SIDELINK RELAY ADAPTATION LAYER FOR UE-TO-NETWORK RELAY IN A WIRELESS COMMUNICATION SYSTEM

CROSS-REFERENCE TO RELATED APPLICATIONS

The present Application claims the benefit of U.S. Provisional Patent Application Ser. No. 63/319,857 filed on Mar. 15, 2022, the entire disclosure of which is incorporated herein in its entirety by reference.

FIELD

This disclosure generally relates to wireless communication networks, and more particularly, to a method and apparatus for supporting sidelink relay adaptation layer for User Equipment (UE)-to-Network relay in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for Sidelink Relay Adaptation Protocol (SRAP) Data Protocol Data Unit (PDU) discarding. In one embodiment, the method includes a relay UE establishing a PC5 connection with a remote UE. The method further includes the relay UE receiving a SRAP Data PDU from the remote UE. The method also includes the relay UE preventing from discarding the SRAP Data PDU if the SRAP Data PDU is the first SRAP Data PDU received from the remote UE via SL-RLC1, wherein a header of the first SRAP Data PDU contains a UE Identity/Identifier (ID) of the remote UE, and the UE ID of the remote UE is not included in any SRAP configuration of the relay UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: 3GPP TS 23.304 V17.0.0, "Study on system enhancement for Proximity based services (ProSe) in the 5G System (5GS) (Release 17)"; 3GPP R2-220wxyz [Post117-e][602][Relay] Relay CR to 38.300 (MediaTek), running CR of TS 38.300, document "DRAFT R2-220wxyz 38.300 CR(0403) on Introduction of SL Relay_v9 (Rapp).docx"; 3GPP R2-220xxxx [Post117-e][601][Relay] Relay CR to 38.331 (Huawei), running CR of TS 38.331, document "R2-220xxxx_38331_CR#2910_Rel-17_Introduction of SL relay_v21_Clean.docx"; and 3GPP R2-2203947, running CR of TS 38.351. The standards and documents listed above are hereby expressly incorporated by reference in their entirety.

Figure 1:
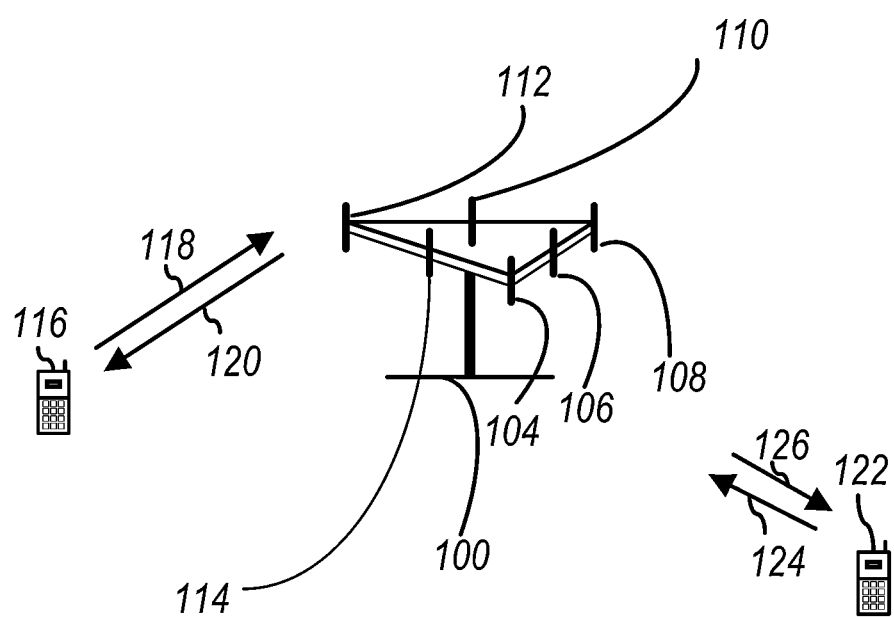
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
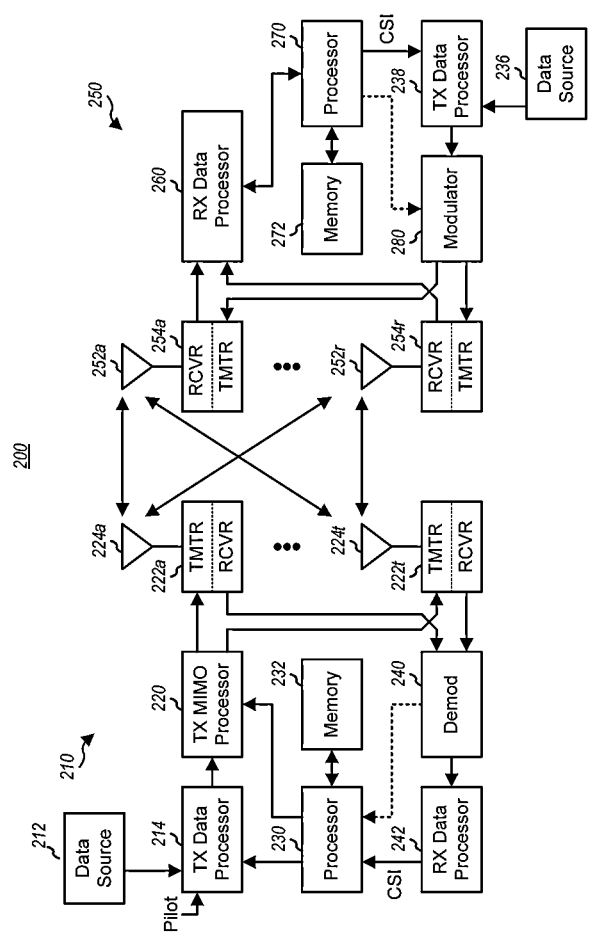
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
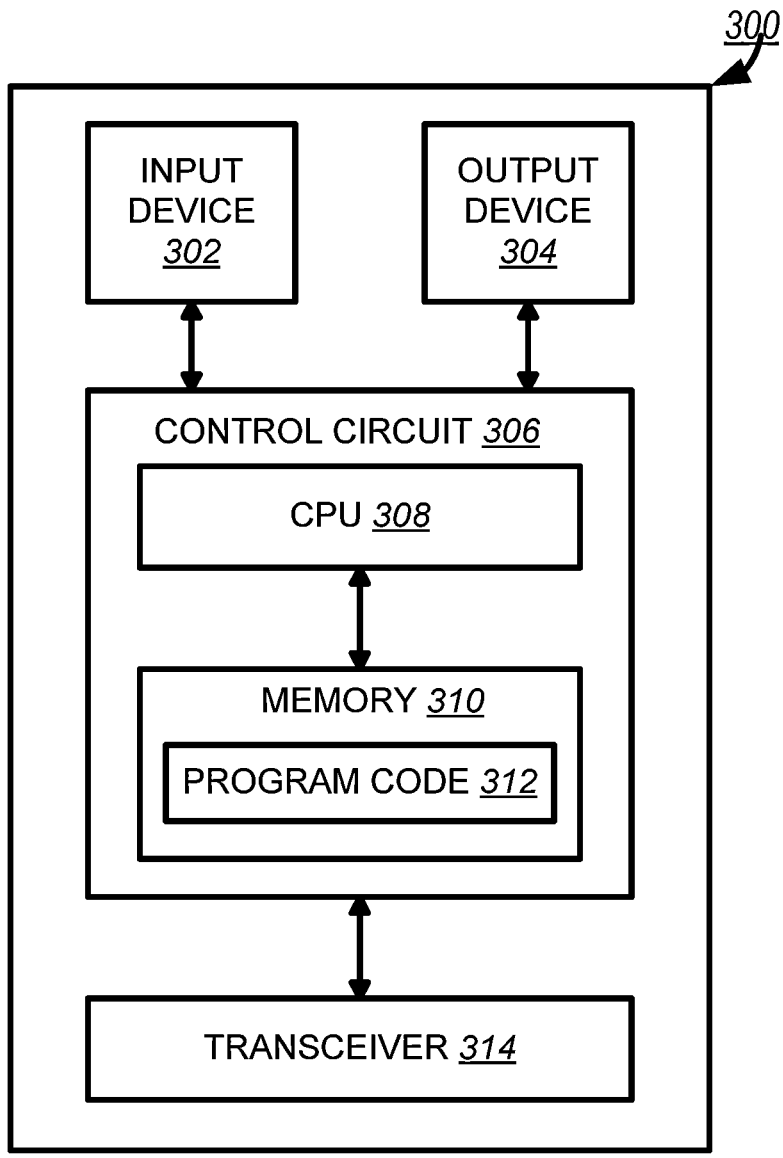
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
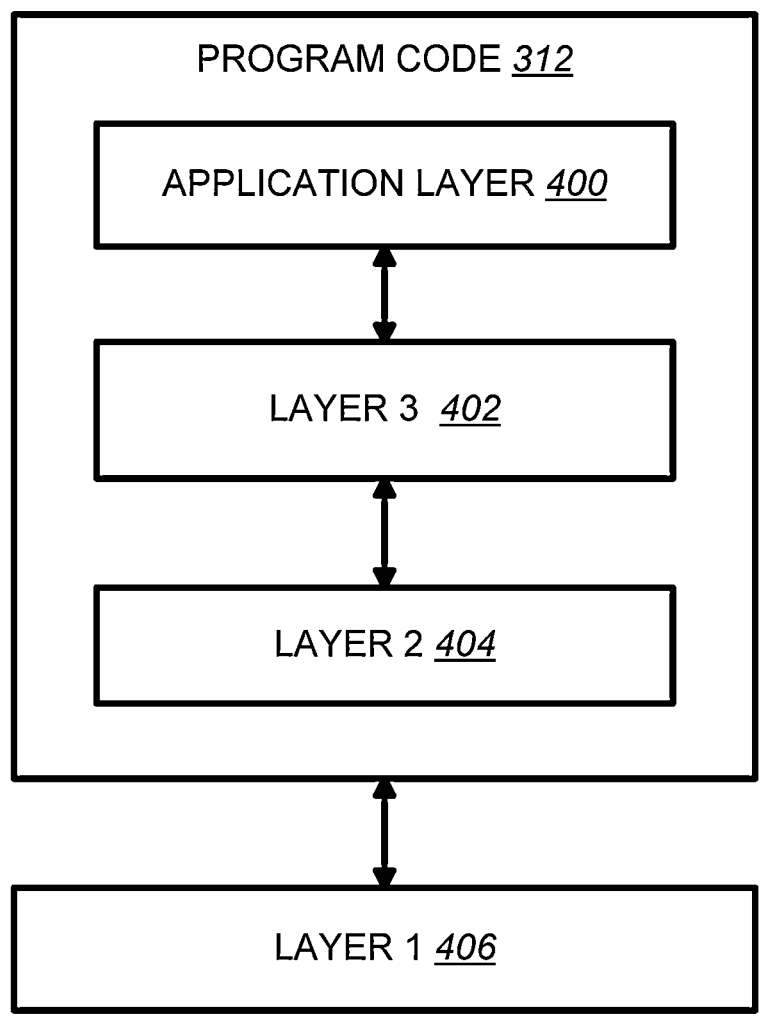
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 specifies 5G Proximity-based Services (ProSe) Layer-2 User Equipment (UE)-to-Network Relay reference architecture to support UE-to-Network Relay for NR Release 17 as follows:

4.2.7.2 5G ProSe Layer-2 UE-to-Network Relay reference architecture

FIG. 4.2.7.2-1 show the 5G ProSe Layer-2 UE-to-Network Relay reference architecture. The 5G ProSe Layer-2 Remote UE and 5G ProSe Layer-2 UE-to-Network Relay may be served by the same or different PLMNs. If the serving PLMNs of the 5G ProSe Layer-2 Remote UE and the 5G ProSe Layer-2UE-to-Network Relay are different then NG-RAN is shared by the serving PLMNs, see the 5G MOCN architecture in clause 5.18 of TS 23.501 [4].

Figure 5:
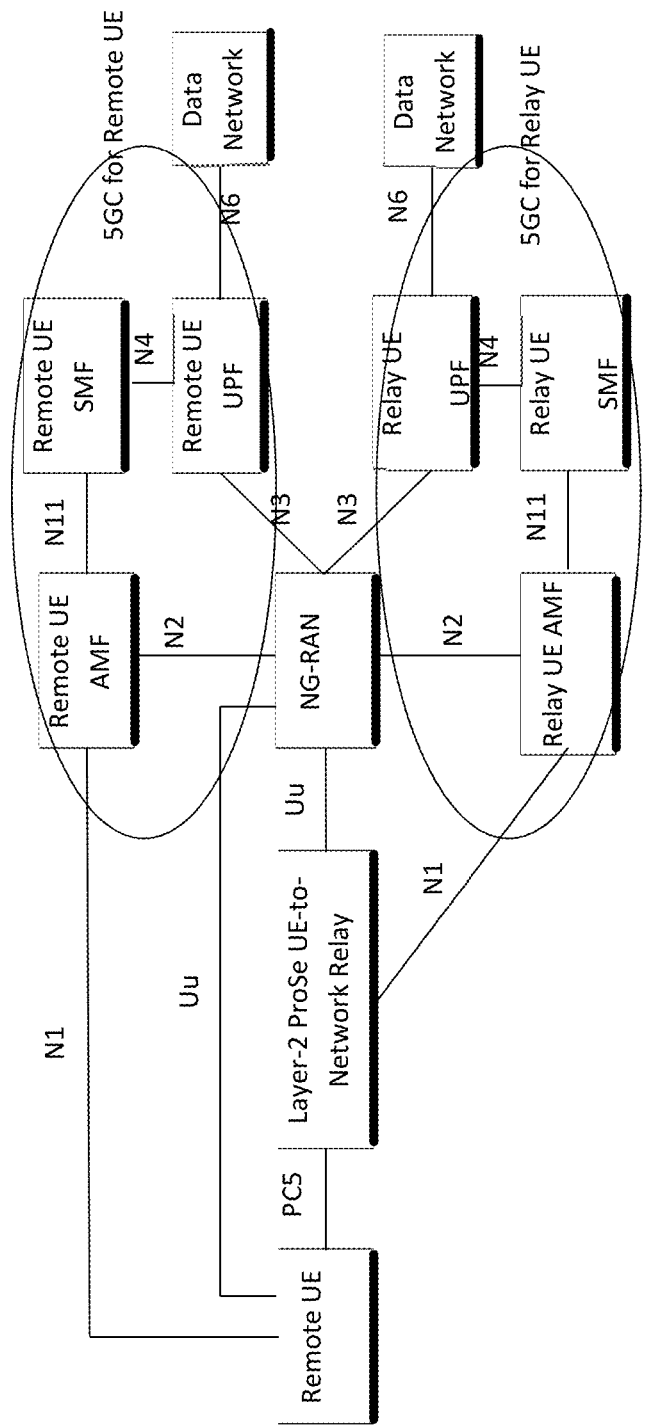
FIG. 5 is a reproduction of FIG. 4.2.7.2-1 3GPP TS 23.304 V17.0.0.

[FIG. 4.2.7.2-1 3GPP TS 23.304 V17.0.0, Entitled "5G ProSe Layer-2 UE-to-Network Relay Reference Architecture", is Reproduced as FIG. 5]

NOTE 1: Uu between the 5G ProSe Layer-2 Remote UE and NG-RAN consists of RRC, SDAP and PDCP.

NOTE 2: The 5G ProSe Layer-2 Remote UE and 5G ProSe Layer-2 UE-to-Network Relay are served by the same NG-RAN. The Core Network entities (e.g., AMF, SMF, UPF) serving the 5G ProSe Layer-2 Remote UE and the 5G ProSe Layer-2 UE-to-Network Relay can be the same or different.

[ . . . ]

4.3.9 5G ProSe UE-to-Network Relay 4.3.9.1 General

Both 5G ProSe Layer-2 and Layer-3 UE-to-Network Relay entity provides the relaying functionality to support connectivity to the network for 5G ProSe Remote UEs. It can be used for both public safety services and commercial services (e.g. interactive service). Both 5G ProSe Layer-2 and Layer-3 UE-to-Network Relay supports the following functions to enable connectivity to the network:

- 5G ProSe UE-to-Network Relay Discovery service as defined in clause 6.3.2.3, to allow discovery by the 5G ProSe Remote UE;
- access the 5GS as a UE as defined in TS 23.501 [4] with the enhancements as specified in clauses 6.2 and 6.6;
- relays unicast traffic (uplink and downlink) between the 5G ProSe Remote UE and the network, supporting IP, Ethernet or Unstructured traffic type.

NOTE: Relaying MBS traffic to a 5G ProSe Remote UE by a 5G ProSe UE-to-Network Relay is not supported in this release of the specification.

[ . . . ]

3GPP Stage 2 running CR for TS 38.300 (as captured in 3GPP R2-220wxyz) introduces Sidelink Relay to NR Rel-17 in TS 38.300. The related procedures are provided below:

16.x Sidelink Relay 16.x.1 General

Sidelink relay is introduced to support 5G ProSe UE-to-Network Relay (U2N Relay) function (specified in TS 23.304 [xx]) to provide connectivity to the network for U2N Remote UE(s). Both L2 and L3 U2N Relay architectures are supported. The L3 U2N Relay architecture is transparent to the serving RAN of the U2N Relay UE, except for controlling sidelink resources. The detailed architecture and procedures for L3 U2N Relay can be found in TS 23.304 [xx]. A U2N Relay UE shall be in RRC_CONNECTED to perform relaying of unicast data. For L2 U2N Relay operation, the following RRC state combinations are supported:

- Both U2N Relay UE and U2N Remote UE shall be in RRC_CONNECTED to perform transmission/reception of relayed unicast data.
- The U2N Relay UE can be in RRC_IDLE, RRC_INACTIVE or RRC_CONNECTED as long as all the U2N Remote UE(s) that are connected to the U2N Relay UE are either in RRC_INACTIVE or in RRC_IDLE.

For L2 U2N Relay, the U2N Remote UE can only be configured to use resource allocation mode 2 (as specified in 5.7.2 and 16.9.3.1) for data to be relayed.

A single unicast link is established between one L2 U2N Relay UE and one L2 U2N Remote UE. The traffic of U2N Remote UE via a given U2N Relay UE and the traffic of the U2N Relay UE shall be separated in different Uu RLC channels over Uu.

Figures 15, 16:
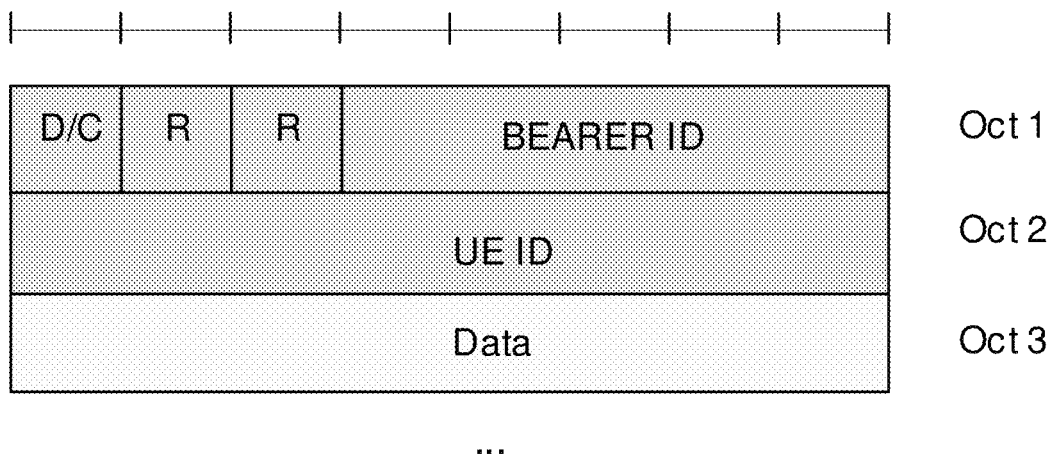
FIG. 15 is a reproduction of FIG. 6.2.2-1 of 3GPP R2-2203947.
FIG. 16 is a reproduction of Table 6.3.6-1 of 3GPP R2-2203947.

16.x.2 Protocol Architecture 16.x.2.1 L2 UE-to-Network Relay The protocol stacks for the user plane and control plane of L2 U2N Relay architecture are presented in FIG. 16.x.2.1-1 and FIG. 16.x.2.1-2. The SRAP sublayer is placed above the RLC sublayer for both CP and UP at both PC5 interface and Uu interface. The Uu SDAP, PDCP and RRC are terminated between L2 U2N Remote UE and gNB, while SRAP, RLC, MAC and PHY are terminated in each hop (i.e. the link between L2 U2N Remote UE and L2 U2N Relay UE and the link between L2 U2N Relay UE and the gNB).

For L2 U2N Relay, the SRAP sublayer over PC5 hop is only for the purpose of bearer mapping. The SRAP sublayer is not present over PC5 hop for relaying the L2 U2N Remote UE's message on BCCH and PCCH. For L2 U2N Remote UE's message on SRB0, the SRAP sublayer is not present over PC5 hop, but the SRAP sublayer is present over Uu hop for both DL and UL.

Figure 6:
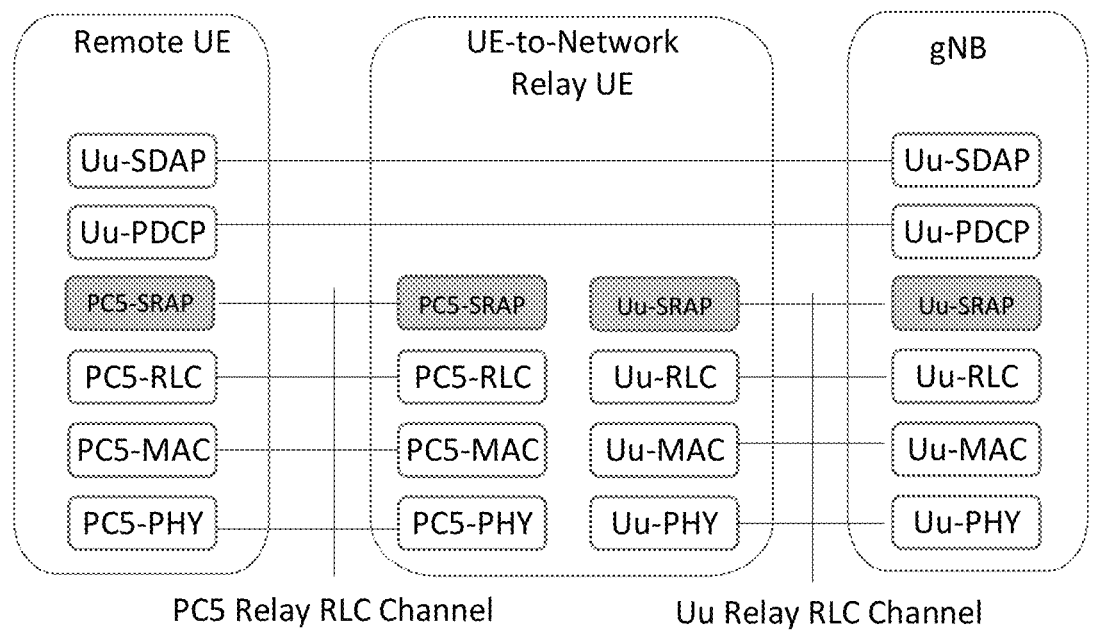
FIG. 6 is a reproduction of FIG. 16.x.2.1-1 of 3GPP R2-220wxyz (running CR of TS 38.300).

[FIG. 16.x.2.1-1 of 3GPP R2-220Wxyz, Entitled "User Plane Protocol Stack for L2 UE-to-Network Relay", is Reproduced as FIG. 6]

Figure 7:
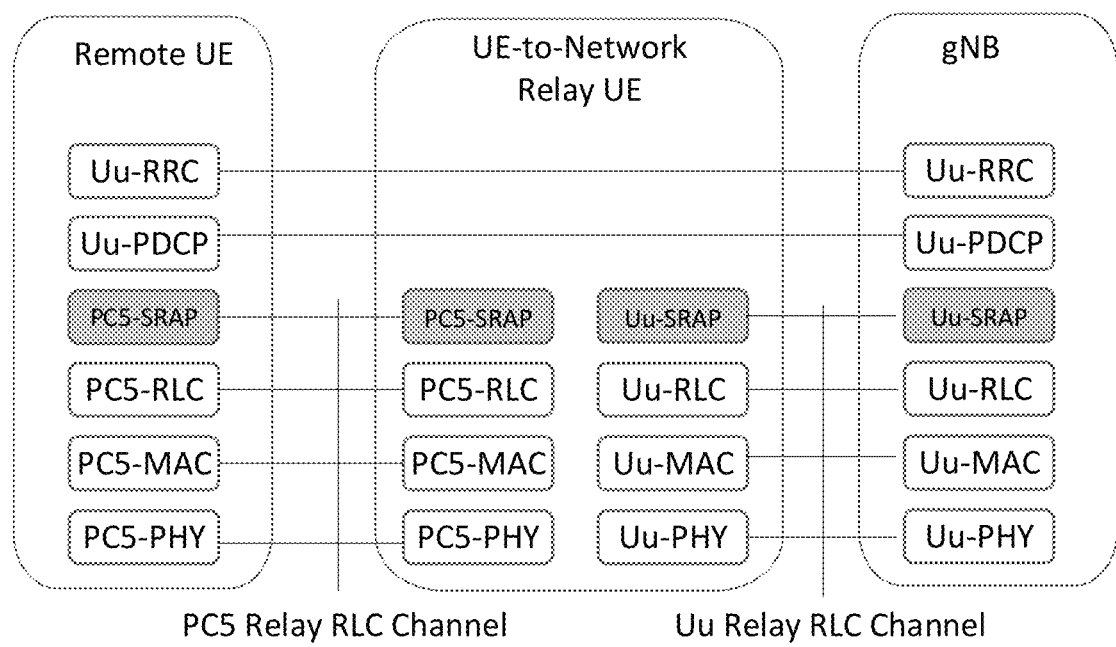
FIG. 7 is a reproduction of FIG. 16.x.2.1-2 of 3GPP R2-220wxyz (running CR of TS 38.300).

[FIG. 16.x.2.1-2 of 3GPP R2-220Wxyz, Entitled "Control Plane Protocol Stack for L2 UE-to-Network Relay", is Reproduced as FIG. 7]

For L2 U2N Relay, for uplink:

- The Uu SRAP sublayer supports UL bearer mapping between ingress PC5 Relay RLC channels for relaying and egress Uu Relay RLC channels over the L2 U2N Relay UE Uu interface. For uplink relaying traffic, the different end-to-end RBs (SRBs or DRBs) of the same Remote UE and/or different Remote UEs can be multiplexed over the same Uu Relay RLC channel.
- The Uu SRAP sublayer supports L2 U2N Remote UE identification for the UL traffic. The identity information of L2 U2N Remote UE Uu Radio Bearer and a local Remote UE ID are included in the Uu SRAP header at UL in order for gNB to correlate the received packets for the specific PDCP entity associated with the right Uu Radio Bearer of a Remote UE.

The PC5 SRAP sublayer at the L2 U2N Remote UE supports UL bearer mapping between Remote UE Uu Radio Bearers and egress PC5 Relay RLC channels.

For L2 U2N Relay, for downlink:

The Uu SRAP sublayer supports DL bearer mapping at gNB to map end-to-end Radio Bearer (SRB, DRB) of Remote UE into Uu Relay RLC channel over Relay UE Uu interface. The Uu SRAP sublayer supports DL bearer mapping and data multiplexing between multiple end-to-end Radio Bearers (SRBs or DRBs) of a L2 U2N Remote UE and/or different L2 U2N Remote UEs and one Uu Relay RLC channel over the Relay UE Uu interface.

The Uu SRAP sublayer supports Remote UE identification for DL traffic. The identity information of Remote UE Uu Radio Bearer and a local Remote UE ID are included into the Uu SRAP header by the gNB at DL in order for Relay UE to map the received packets from Remote UE Uu Radio Bearer to its associated PC5 Relay RLC channel.

The PC5 SRAP sublayer at the Relay UE supports DL bearer mapping between ingress Uu Relay RLC channels and egress PC5 Relay RLC channels.

The PC5 SRAP sublayer at the Remote UE correlates the received packets for the specific PDCP entity associated with the right Uu Radio Bearer of a Remote UE based on the identity information included in the Uu SRAP header.

A local Remote UE ID is included in both PC5 SRAP header and Uu SRAP header. L2 U2N Relay UE is configured by the gNB with the local Remote UE ID to be used in SRAP header. Remote UE obtains the local Remote ID from the gNB via Uu RRC messages including RRCSetup, RRCReconfiguration, RRCResume and RRCReestablishment. Uu DRB(s) and Uu SRB(s) are mapped to different PC5 Relay RLC channels and Uu Relay RLC channels in both PC5 hop and Uu hop.

It is the gNB responsibility to avoid collision on the usage of local Remote UE ID. The gNB can update the local Remote UE ID by sending the updated local Remote ID via RRCReconfiguration message to the Relay UE. The serving gNB can perform local Remote UE ID update independent of the PC5 unicast link L2 ID update procedure.

[ . . . ]

16.x.5 Control Plane Procedures for L2 U2N Relay 16.x.5.1 RRC Connection Management The U2N Remote UE needs to establish its own PDU sessions/DRBs with the network before user plane data transmission.

The NR V2X PC5 unicast link establishment procedures can be reused to setup a secure unicast link between U2N Remote UE and U2N Relay UE before U2N Remote UE establishes a Uu RRC connection with the network via U2N Relay UE.

The establishment of Uu SRB1/SRB2 and DRB of the U2N Remote UE is subject to Uu configuration procedures for L2 UE-to-Network Relay.

Figure 8:
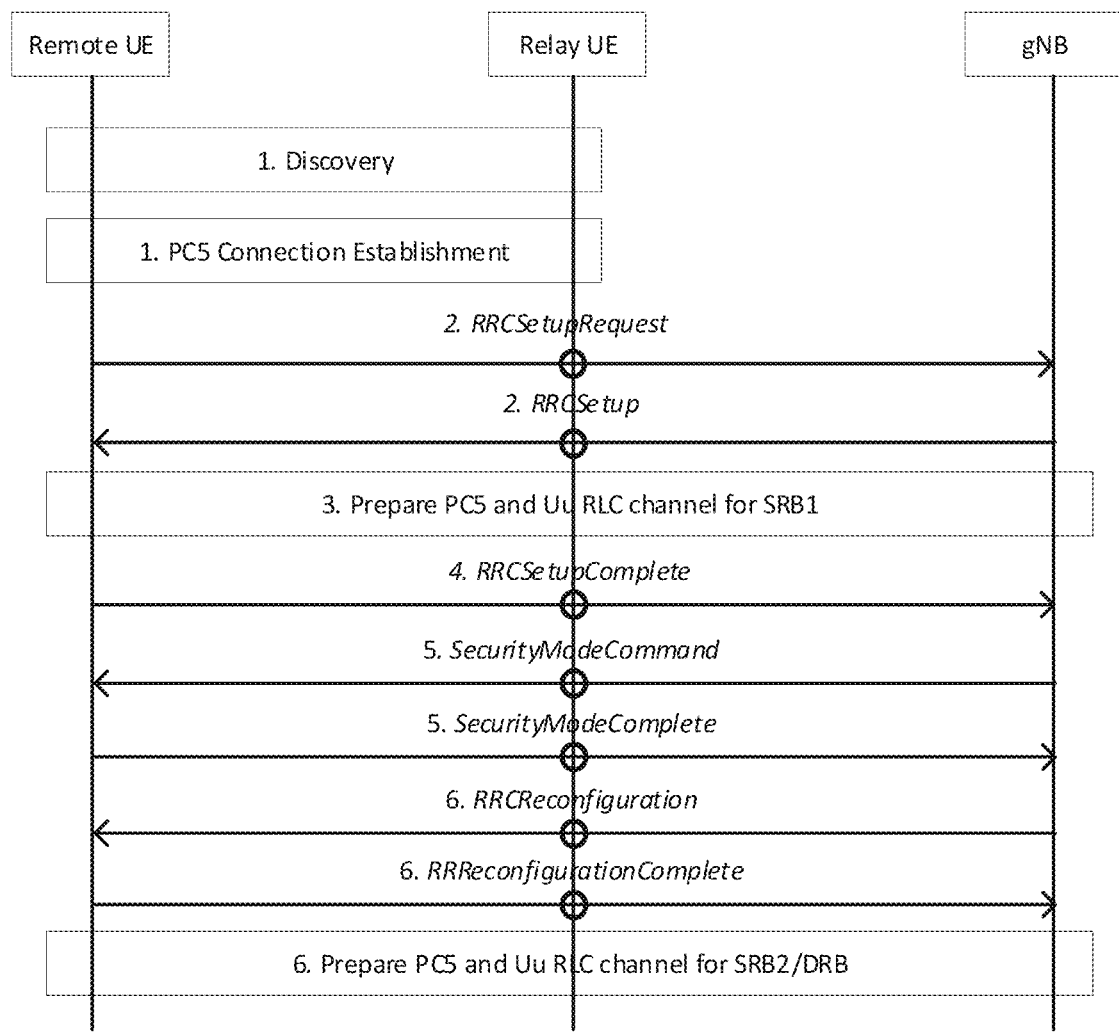
FIG. 8 is a reproduction of FIG. 16.x.5.1-1 of 3GPP R2-220wxyz (running CR of TS 38.300).

The following high level connection establishment procedure in FIG. 16.x.5.1-1 applies to L2 U2N Relay:

[FIG. 16.x.5.1-1 of 3GPP R2-220Wxyz, Entitled "Procedure for L2 U2N Remote UE Connection Establishment", is Reproduced as FIG. 8]

1. The U2N Remote and U2N Relay UE perform discovery procedure, and establish PC5-RRC connection using NR V2X procedure.

2. The U2N Remote UE sends the first RRC message (i.e., RRCSetupRequest) for its connection establishment with gNB via the Relay UE, using a specified PC5 Relay RLC channel configuration. If the U2N Relay UE is not in RRC_CONNECTED, it needs to do its own connection establishment upon reception of a message on the specified PC5 Relay RLC channel. During Relay UE's RRC connection establishment procedure, gNB may configure SRB0 relaying Uu Relay RLC channel to the U2N Relay UE. The gNB responds with an RRCSetup message to U2N Remote UE. The RRCSetup message is sent to the U2N Remote UE using SRB0 relaying channel over Uu and a specified PC5 Relay RLC channel over PC5.

3. The gNB and U2N Relay UE perform relaying channel setup procedure over Uu. According to the configuration from gNB, the U2N Relay/Remote UE establishes an PC5 Relay RLC channel for relaying of SRB1 towards the U2N Remote/Relay UE over PC5.

4. The RRCSetupComplete message is sent by the U2N Remote UE to the gNB via the U2N Relay UE using SRB1 relaying channel over PC5 and SRB1 relaying channel configured to the U2N Relay UE over Uu. Then the U2N Remote UE is RRC connected over Uu.

5. The U2N Remote UE and gNB establish security following Uu procedure and the security messages are forwarded through the U2N Relay UE.

6. The gNB sends an RRCReconfiguration message to the U2N Remote UE via the U2N Relay UE, to setup the SRB2/DRBs for relaying purpose. The U2N Remote UE sends an RRCReconfigurationComplete message to the gNB via the U2N Relay UE as a response. In addition, the gNB configures additional Uu Relay RLC channels between the gNB and U2N Relay UE, and PC5 Relay RLC channels between U2N Relay UE and U2N Remote UE for the relay traffic.

[ . . . ]

Figure 9:
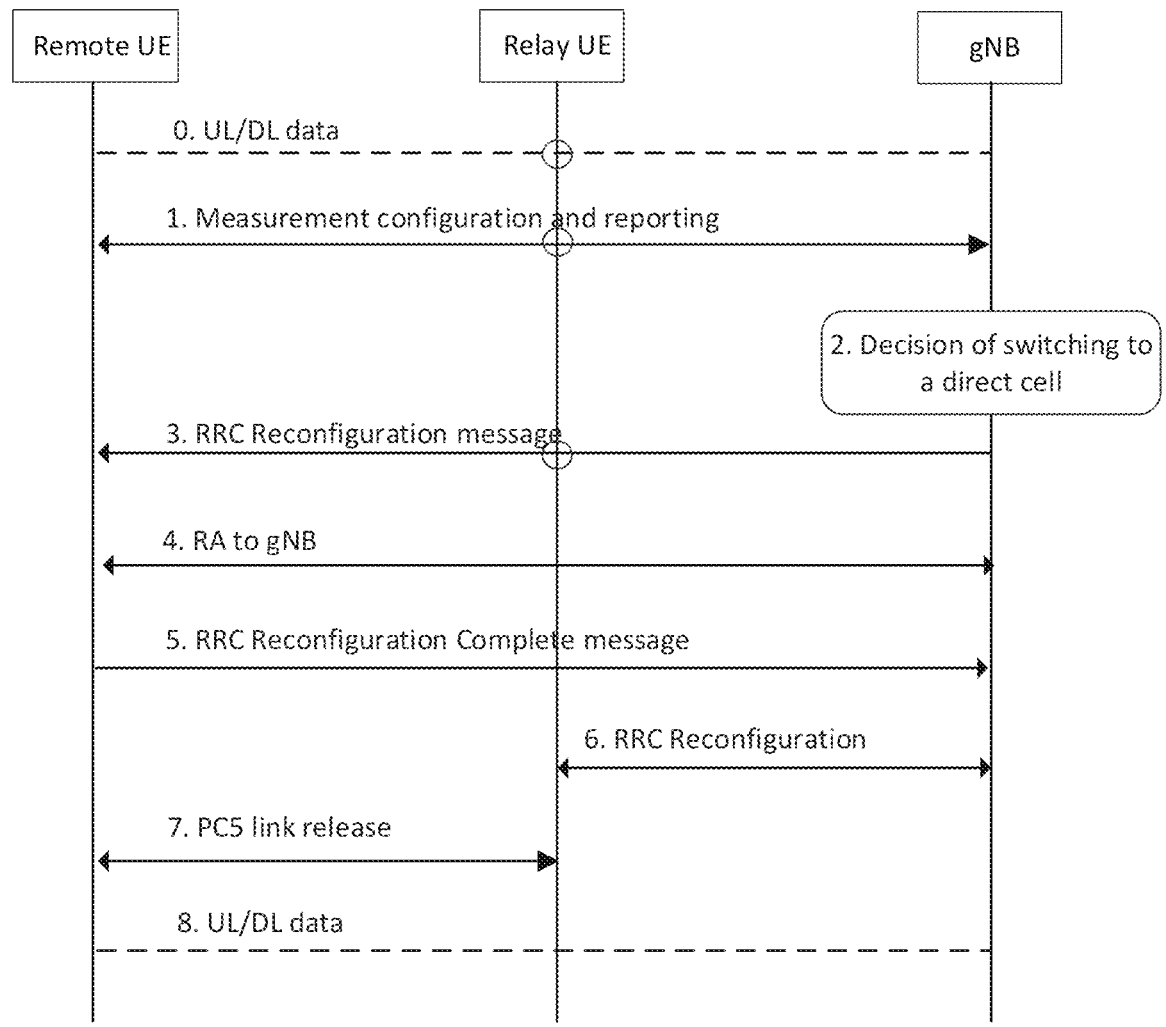
FIG. 9 is a reproduction of FIG. 16.x.6.1-1 of 3GPP R2-220wxyz (running CR of TS 38.300).

16.x.6 Service Continuity for L2 U2N Relay 16.x.6.1 Switching from Indirect to Direct Path For service continuity of L2 U2N Relay, the following procedure is used, in case of U2N Remote UE switching to direct path:

[FIG. 16.x.6.1-1 of 3GPP R2-220Wxyz, Entitled "Procedure for U2N Remote UE Switching to Direct Uu Cell", is Reproduced as FIG. 9]

1. The Uu measurement configuration and measurement report signalling procedures are performed to evaluate both relay link measurement and Uu link measurement. The measurement results from U2N Remote UE are reported when configured measurement reporting criteria are met. The sidelink relay measurement report shall include at least U2N Relay UE's source L2 ID, serving cell ID (i.e. NCGI), and sidelink measurement quantity information. The sidelink measurement quantity can be SL-RSRP of the serving U2N Relay UE, and if SL-RSRP is not available, SD-RSRP is used.

2. The gNB decides to switch the U2N Remote UE onto direct Uu path.

3. The gNB sends RRCReconfiguration message to the U2N Remote UE. The U2N Remote UE stops UP and CP transmission via U2N Relay UE after reception of RRCReconfiguration message from the gNB.

4. The U2N Remote UE synchronizes with the gNB and performs Random Access.

5. The UE (i.e. U2N Remote UE in previous steps) sends the RRCReconfigurationComplete to the gNB via direct path, using the configuration provided in the RRCReconfiguration message. From this step, the UE (i.e. U2N Remote UE in previous steps) uses the RRC connection via the direct path to the gNB.

6. The gNB sends RRCReconfiguration message to the U2N Relay UE to reconfigure the connection between the U2N Relay UE and the gNB. The RRCReconfiguration message to the U2N Relay UE can be sent any time after step 3 based on gNB implementation (e.g. to release Uu and PC5 Relay RLC channel configuration for relaying, and bearer mapping configuration between PC5 RLC and Uu RLC).

7. Either U2N Relay UE or U2N Remote UE can initiate the PC5 unicast link release (PC5-S). The timing to execute link release is up to UE implementation. The U2N Relay UE can execute PC5 connection reconfiguration to release PC5 Relay RLC channel for relaying upon reception of RRC Reconfiguration by gNB in Step 6, or the UE (i.e. previous U2N Remote UE) can execute PC5 connection reconfiguration to release PC5 Relay RLC channel for relaying upon reception of RRCReconfiguration by gNB in Step 3.

8. The data path is switched from indirect path to direct path between the UE (i.e. previous U2N Remote UE) and the gNB. The DL/UL lossless delivery during the path switch is done according to PDCP data recovery procedure.

NOTE: Step 8 can be executed any time after step 4. Step 8 is independent of step 6 and step 7.

16.x.6.2 Switching from Direct to Indirect Path

The gNB can select a U2N Relay UE in any RRC state i.e., RRC_IDLE, RRC_INACTIVE, or RRC_CONNECTED, as a target U2N Relay UE for direct to indirect path switch.

Figure 10:
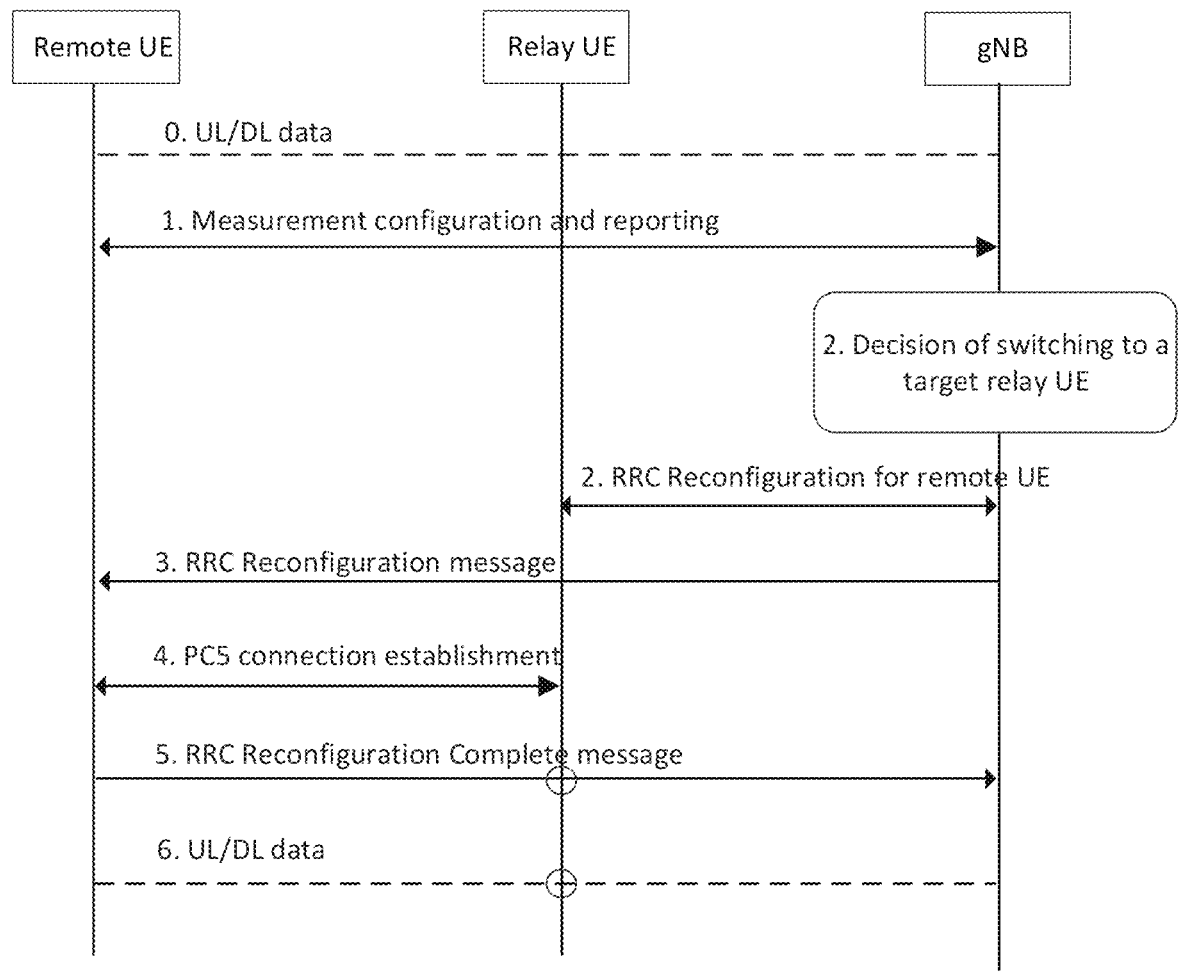
FIG. 10 is a reproduction of FIG. 16.x.6.2-1 of 3GPP R2-220wxyz (running CR of TS 38.300).

For service continuity of L2 U2N Remote UE, the following procedure is used, in case of the L2 U2N Remote UE switching to indirect path via a U2N Relay UE in RRC_CONNECTED:

[FIG. 16.x.6.2-1 of 3GPP R2-220Wxyz, Entitled "Procedure for U2N Remote UE Switching to Indirect Path", is Reproduced as FIG. 10]

1. The U2N Remote UE reports one or multiple candidate U2N Relay UE(s) and Uu measurements, after it measures/discovers the candidate U2N Relay UE(s).

The UE may filter the appropriate U2N Relay UE(s) according to Relay selection criteria before reporting. The UE shall report only the U2N Relay UE candidate(s) that fulfil the higher layer criteria.

The reporting can include at least U2N Relay UE ID, U2N Relay UE's serving cell ID, and sidelink measurement quantity information. The sidelink measurement quantity can be SL-RSRP of the candidate U2N Relay UE, and if SL-RSRP is not available, SD-RSRP is used.

2. The gNB decides to switch the U2N Remote UE to a target U2N Relay UE. Then the gNB sends an RRCReconfiguration message to the target U2N Relay UE, which can include at least Remote UE's local ID and L2 ID, Uu and PC5 Relay RLC channel configuration for relaying, and bearer mapping configuration.

3. The gNB sends the RRCReconfiguration message to the U2N Remote UE. The contents in the RRCReconfiguration message can include at least U2N Relay UE ID, PC5 Relay RLC channel configuration for relay traffic and the associated end-to-end radio bearer(s). The U2N Remote UE stops UP and CP transmission over Uu after reception of RRCReconfiguration message from the gNB.

4. The U2N Remote UE establishes PC5 connection with target U2N Relay UE

5. The U2N Remote UE completes the path switch procedure by sending the RRCReconfigurationComplete message to the gNB via the Relay UE.

6. The data path is switched from direct path to indirect path between the U2N Remote UE and the gNB.

In case the selected U2N Relay UE for direct to indirect path switch is in RRC_IDLE or RRC_INACTIVE, after receiving the path switch command, the U2N Remote UE establishes a PC5 link with the U2N Relay UE and sends the RRCReconfigurationComplete message via the U2N Relay UE, which will trigger the U2N Relay UE to enter RRC_CONNECTED state. The procedure for U2N Remote UE switching to indirect path in FIG. 16.x.6.2-1 can be also applied for the case that the selected U2N Relay UE for direct to indirect path switch is in RRC_IDLE or RRC_INACTIVE with the exception that step 4 is performed before step 2.

3GPP running CR of TS 38.331 (as captured in 3GPP R2-220xxxx) introduces Sidelink Relay to NR Rel-17 in TS 38.331. The related procedures are provided below:

5.3.3.1a Conditions for Establishing RRC Connection for NR Sidelink Communication/Discovery/V2X Sidelink Communication For NR sidelink communication/discovery, an RRC connection establishment is initiated only in the following cases:

1> if configured by upper layers to transmit NR sidelink communication/discovery and related data is available for transmission:

2> if the frequency on which the UE is configured to transmit NR sidelink communication is included in sl-FreqInfoList within SIB12 provided by the cell on which the UE camps; and if the valid version of SIB12 does not include sl-TxPoolSelectedNormal for the concerned frequency; or 2> if the frequency on which the UE is configured to transmit NR sidelink discovery is included in sl-FreqInfoList within SIB12 provided by the cell on which the UE camps; and if the valid version of SIB12 does not include sl-DiscTxPoolSelected or sl-TxPoolSelectedNormal for the concerned frequency;

For L2 U2N Relay UE in RRC_IDLE, an RRC connection establishment is initiated in the following cases:

1> if any message is received from a L2 U2N Remote UE via SL-RLC0 as specified in 9.1.1.4 or SL-RLC1 as specified in 9.2.x;

[ . . . ]

5.3.13.1a Conditions for Resuming RRC Connection for NR Sidelink Communication/Discovery/V2X Sidelink Communication For NR sidelink communication/discovery an RRC connection is resumed only in the following cases:

1> if configured by upper layers to transmit NR sidelink communication/discovery and related data is available for transmission:

2> if the frequency on which the UE is configured to transmit NR sidelink communication is included in sl-FreqInfoList within SIB12 provided by the cell on which the UE camps; and if the valid version of SIB12 does not include sl-TxPoolSelectedNormal for the concerned frequency; or 2> if the frequency on which the UE is configured to transmit NR sidelink discovery is included in sl-FreqInfoList within SIB12 provided by the cell on which the UE camps; and if the valid version of SIB12 does not include sl-DiscTxPoolSelected or sl-TxPoolSelectedNormal for the concerned frequency;

For L2 U2N Relay UE in RRC_INACTIVE, an RRC connection establishment is resumed in the following cases:
1> if any message is received from the L2 U2N Remote UE via SL-RLC0 as specified in 9.1.1.4 or SL-RLC1 as specified in 9.2.x;
[ . . . ]

5.3.5.3 Reception of an RRCReconfiguration by the UE

The UE shall perform the following actions upon reception of the RRCReconfiguration, or upon execution of the conditional reconfiguration (CHO or CPC):
. . .
1> if the RRCReconfiguration message includes the sl-L2RelayUEConfig:
   2> perform the L2 U2N Relay UE configuration procedure as specified in 5.3.5.x1;
1> if the RRCReconfiguration message includes the sl-L2RemoteUEConfig:
   2> perform the L2 U2N Remote UE configuration procedure as specified in 5.3.5.x2;
[ . . . ]

5.3.5.5.2 Reconfiguration with Sync

The UE shall perform the following actions to execute a reconfiguration with sync.
[ . . . ]
1> if sl-PathSwitchConfig is included:
   2> consider the target L2 U2N Relay UE to be the one indicated by the targetRelayUEIdentity in the sl-PathSwitchConfig; 2> start timer Txxx for the corresponding target L2 U2N Relay UE with the timer value set to txxx, as included in the sl-PathSwitchConfig;
   2> apply the value of the newUE-Identity as the C-RNTI;
   2> perform the PC5-RRC connection establishment with the target L2 U2N Relay UE indicated by the targetRelayUEIdentity, if needed;
   2> apply the default configuration of SL-RLC1 as defined in 9.2.x for SRB1;
[ . . . ]

5.3.5.14 Sidelink Dedicated Configuration

Upon initiating the procedure, the UE shall:
[ . . . ]
1> if sl-RLC-ChannelToReleaseList is included in sl-ConfigDedicatedNR within RRCReconfiguration:
   2> perform PC5 Relay RLC channel release as specified in 5.8.9.1.2;
1> if sl-RLC-ChannelToAddModList is included in sl-ConfigDedicatedNR within RRCReconfiguration:
   2> perform PC5 Relay RLC channel addition/modification as specified in 5.8.9.1.2;
[ . . . ]

5.3.5.x1 L2 U2N Relay UE Configuration 5.3.5.x1.1 General

The network configures the L2 U2N Relay UE with relay operation related configurations. For each connected L2 U2N Remote UE indicated in sl-L2Identity-Remote, the network provides the configuration parameters used for data relaying.

The UE performs the following actions based on a received sl-L2RelayUEConfig:
1> if the sl-L2RelayUEConfig contains the sl-RemoteUE-ToReleaseList:
   2> perform the L2 U2N Remote UE release as specified in 5.3.5.x1.2;
1> if the sl-L2RelayUEConfig contains the sl-RemoteUE-ToAddModList:
   2> perform the L2 U2N Remote UE addition/modification as specified in 5.3.5.x1.3;

5.3.5.x1.2 L2 U2N Remote UE Release

The L2 U2N Relay UE shall:
1> if the release is triggered by reception of the sl-RemoteUE-ToReleaseList:
   2> for each sl-L2Identity-Remote value included in the sl-RemoteUE-ToReleaseList:
     3> if the current UE has a PC5 RRC connection to a L2 U2N Remote UE with sl-L2Identity-Remote:
        4> perform the PC5-RRC connection release as specified in 5.8.9.5.

5.3.5.x1.3 L2 U2N Remote UE Addition/Modification

The L2 U2N Relay UE shall:
1> for each sl-L2Identity-Remote value included in the sl-RemoteUE-ToAddModList that is not part of the current UE configuration (L2 U2N Remote UE Addition):
   2> configure the parameters to SRAP entity in accordance with the sl-SRAP-Config-Relay;
1> for each sl-L2Identity-Remote value included in the sl-RemoteUE-ToAddModList that is part of the current UE configuration (L2 U2N Remote UE modification):
   2> modify the configuration in accordance with the sl-SRAP-Config-Relay;

5.3.5.x2 L2 U2N Remote UE Configuration 5.3.5.x2.1 General

The network configures the L2 U2N Remote UE with relay operation related configurations, e.g. SRAP configuration.

The UE performs the following actions:
1> if the sl-L2RemoteUEConfig contains the sl-SRAP-Config-Remote:
   2> configure the parameters to SRAP entity in accordance with the sl-SRAP-Config-Remote;
1> if the sl-L2RemoteUEConfig contains the sl-Serving-CellInfo:
   2> use the value of the sl-PhysCellId as the physical cell identity of the PCell;
   2> use the value of the sl-UEIdentityRemote as the C-RNTI in the PCell.
[ . . . ]

5.8.3 Sidelink UE Information for NR Sidelink Communication 5.8.3.1 General

Figure 11:
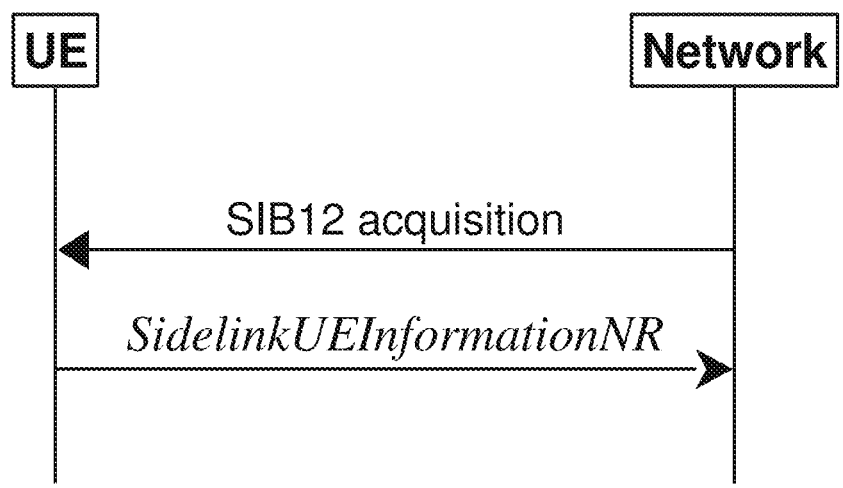
FIG. 11 is a reproduction of FIG. 5.8.3.1-1 3GPP R2-220xxxx (running CR of TS 38.331).
Figure 12:
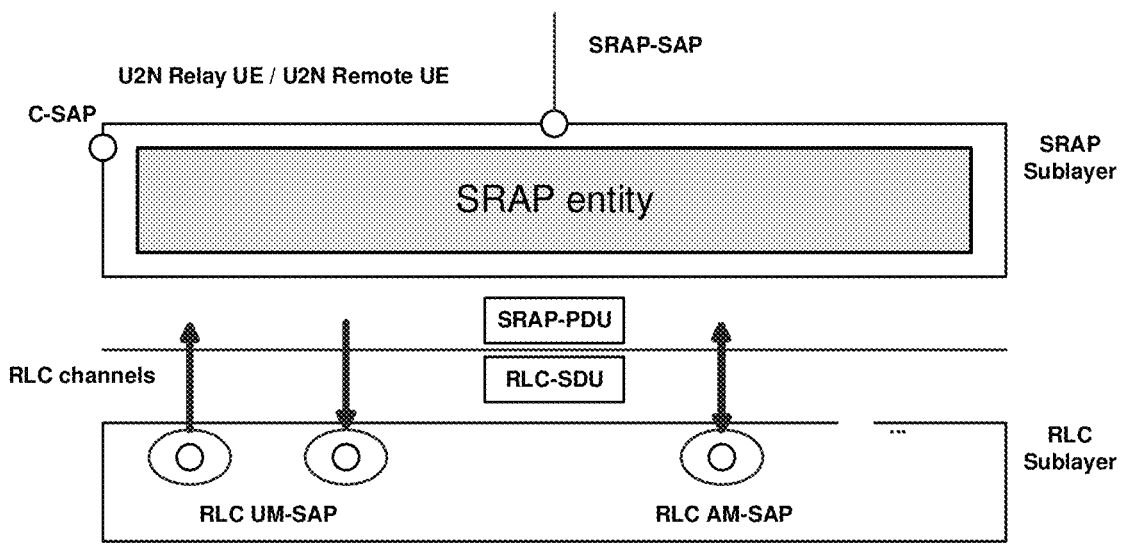
FIG. 12 is a reproduction of FIG. 4.2.2-1 of 3GPP R2-2203947.

[FIG. 5.8.3.1-1 3GPP R2-220xxxx, Entitled "Sidelink UE Information for NR Sidelink Communication", is Reproduced as FIG. 11]

The purpose of this procedure is to inform the network that the UE:
   is interested or no longer interested to receive or transmit NR sidelink communication or discovery,
   is requesting assignment or release of transmission resource for NR sidelink communication or discovery,
   is reporting QoS parameters and QoS profile(s) related to NR sidelink communication,
   is reporting that a sidelink radio link failure or sidelink RRC reconfiguration failure has been detected, is reporting the sidelink UE capability information of the associated peer UE for unicast communication, is reporting the RLC mode information of the sidelink data radio bearer(s) received from the associated peer UE for unicast communication.

is reporting parameters related to U2N relay operation, 5.8.3.2 Initiation

A UE capable of NR sidelink communication or NR sidelink discovery or NR sidelink U2N relay operation that is in RRC_CONNECTED may initiate the procedure to indicate it is (interested in) receiving or transmitting NR sidelink communication or NR sidelink discovery or NR sidelink U2N relay operation in several cases including upon successful connection establishment or resuming, upon change of interest, upon changing QoS profiles, upon receiving UECapabilityInformationSidelink from the associated peer UE, upon RLC mode information updated from the associated peer UE or upon change to a PCell providing SIB12 including sl-ConfigCommonNR. A UE capable of NR sidelink communication may initiate the procedure to request assignment of dedicated sidelink DRB configuration and transmission resources for NR sidelink communication transmission. A UE capable of NR sidelink communication may initiate the procedure to report to the network that a sidelink radio link failure or sidelink RRC reconfiguration failure has been declared. A UE capable of NR sidelink discovery may initiate the procedure to request assignment of dedicated resources for sidelink discovery transmission or sidelink discovery reception. A UE capable of U2N relay operation may initiate the procedure to report/update parameters for acting as U2N Relay UE or U2N Remote UE (including L2 Remote UE's source L2 ID).

Upon initiating this procedure, the UE shall:

1> if SIB12 including sl-ConfigCommonNR is provided by the PCell:

2> ensure having a valid version of SIB12 for the PCell;

2> if configured by upper layers to receive NR sidelink communication on the frequency included in sl-FreqInfoList in SIB12 of the PCell:

3> if the UE did not transmit a SidelinkUEInformationNR message since last entering RRC_CONNECTED state; or 3> if since the last time the UE transmitted a SidelinkUEInformationNR message the UE connected to a PCell not providing SIB12 including sl-ConfigCommonNR; or 3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:

4> initiate transmission of the SidelinkUEInformationNR message to indicate the NR sidelink communication reception frequency of interest in accordance with 5.8.3.3;

2> else:

3> if the last transmission of the SidelinkUEInformationNR message included sl-RxInterestedFreqList:

4> initiate transmission of the SidelinkUEInformationNR message to indicate it is no longer interested in NR sidelink communication reception in accordance with 5.8.3.3;

2> if configured by upper layers to transmit NR sidelink communication on the frequency included in sl-FreqInfoList in SIB12 of the PCell:

3> if the UE did not transmit a SidelinkUEInformationNR message since last entering RRC_CONNECTED state; or 3> if since the last time the UE transmitted a SidelinkUEInformationNR message the UE connected to a PCell not providing SIB12 including sl-ConfigCommonNR; or 3> if the last transmission of the SidelinkUEInformationNR message did not include sl-TxResourceReqList; or if the information carried by the sl-TxResourceReqList has changed since the last transmission of the SidelinkUEInformationNR message:

4> initiate transmission of the SidelinkUEInformationNR message to indicate the NR sidelink communication transmission resources required by the UE in accordance with 5.8.3.3;

2> else:

3> if the last transmission of the SidelinkUEInformationNR message included sl-TxResourceReqList:

4> initiate transmission of the SidelinkUEInformationNR message to indicate it no longer requires NR sidelink communication transmission resources in accordance with 5.8.3.3;

2> if configured by upper layer to receive NR sidelink non-relay discovery announcements on the frequency included in sl-FreqInfoList in SIB12 of the PCell including sl-NonRelayDiscovery:

3> if the UE did not transmit a SidelinkUEInformationNR message since last entering RRC_CONNECTED state; or 3> if since the last time the UE transmitted a SidelinkUEInformationNR message the UE connected to a PCell not providing SIB12 including sl-ConfigCommonNR or connected to a PCell providing SIB12 but not including sl-NonRelayDiscovery; or 3> if the last transmission of the SidelinkUEInformationNR message did not include sl-RxInterestedFreqListDisc; or if the frequency configured by upper layers to receive NR sidelink discovery announcements on has changed since the last transmission of the SidelinkUEInformationNR message:

4> initiate transmission of the SidelinkUEInformationNR message to indicate the NR sidelink discovery reception frequency of interest in accordance with 5.8.3.3;

2> else:

3> if the last transmission of the SidelinkUEInformationNR message included sl-RxInterestedFreqListDisc:

4> initiate transmission of the SidelinkUEInformationNR message to indicate it is no longer interested in NR sidelink discovery announcements reception in accordance with 5.8.3.3;

2> if configured by upper layer to receive NR sidelink L2 U2N relay discovery announcements on the frequency included in sl-FreqInfoList in SIB12 of the PCell including sl-L2U2N-Relay; or if configured by upper layer to receive NR sidelink L3 U2N relay discovery announcements on the frequency included in sl-FreqInfoList in SIB12 of the PCell including sl-L3U2N-RelayDiscovery:
3> if the UE did not transmit a SidelinkUEInformationNR message since last entering RRC_CONNECTED state; or
3> if since the last time the UE transmitted a SidelinkUEInformationNR message the UE connected to a PCell not providing SIB12 including sl-ConfigCommonNR or connected to a PCell providing SIB12 but not including sl-L2U2N-Relay in case of L2 U2N relay operation or connected to a PCell providing SIB12 but not including sl-L3U2N-RelayDiscovery in case of L3 U2N relay operation; or
3> if the last transmission of the SidelinkUEInformationNR message did not include sl-RxInterestedFreqListDisc; or if the frequency configured by upper layers to receive NR sidelink discovery announcements on has changed since the last transmission of the SidelinkUEInformationNR message:
4> if the UE is (capable of) acting as U2N Relay UE, and if SIB12 includes sl-RelayUE-ConfigCommon, and if the U2N Relay UE threshold conditions as specified in 5.8.x2.2 are met; or
4> if the UE is selecting a U2N Relay UE/has a selected U2N Relay UE, and if SIB12 includes sl-RemoteUE-ConfigCommon, and if the U2N Remote UE threshold conditions as specified in 5.8.x3.2 are met:
5> initiate transmission of the SidelinkUEInformationNR message to indicate the NR sidelink discovery reception frequency of interest in accordance with 5.8.3.3;
2> else:
3> if the last transmission of the SidelinkUEInformationNR message included sl-RxInterestedFreqListDisc:
4> initiate transmission of the SidelinkUEInformationNR message to indicate it is no longer interested in NR sidelink discovery announcements reception in accordance with 5.8.3.3;
2> if configured by upper layer to transmit NR sidelink non-relay discovery announcements on the frequency included in sl-FreqInfoList in SIB12 of the PCell including sl-NonRelayDiscovery:
3> if the UE did not transmit a SidelinkUEInformationNR message since last entering RRC_CONNECTED state; or
3> if since the last time the UE transmitted a SidelinkUEInformationNR message the UE connected to a PCell not providing SIB12 including sl-ConfigCommonNR or connected to a PCell providing SIB12 but not including sl-NonRelayDiscovery; or
3> if the last transmission of the SidelinkUEInformationNR message did not include sl-TxResourceReqListDisc; or if the information carried by the sl-TxResourceReqListDisc has changed since the last transmission of the SidelinkUEInformationNR message:
4> initiate transmission of the SidelinkUEInformationNR message to indicate the NR sidelink non-relay discovery announcements resources required by the UE in accordance with 5.8.3.3;
2> else:
3> if the last transmission of the SidelinkUEInformationNR message included sl-TxResourceReqListDisc:
4> initiate transmission of the SidelinkUEInformationNR message to indicate it no longer requires NR sidelink non-relay discovery announcements resources in accordance with 5.8.3.3;
2> if configured by upper layer to transmit NR sidelink L2 U2N relay discovery announcements on the frequency included in sl-FreqInfoList in SIB12 of the PCell including sl-L2U2N-Relay; or if configured by upper layer to transmit NR sidelink L3 U2N relay discovery announcements on the frequency included in sl-FreqInfoList in SIB12 of the PCell including sl-L3U2N-RelayDiscovery:
3> if the UE did not transmit a SidelinkUEInformationNR message since last entering RRC_CONNECTED state; or
3> if since the last time the UE transmitted a SidelinkUEInformationNR message the UE connected to a PCell not providing SIB12 including sl-ConfigCommonNR or connected to a PCell providing SIB12 but not including sl-L2U2N-Relay in case L2 U2N relay operation or connected to a PCell providing SIB12 but not including sl-L3U2N-RelayDiscovery in case of L3 U2N relay operation; or
3> if the last transmission of the SidelinkUEInformationNR message did not include sl-TxResourceReqListDisc; or if the information carried by the sl-TxResourceReqListDisc has changed since the last transmission of the SidelinkUEInformationNR message:
4> if the UE is (capable of) acting as U2N Relay UE, and if SIB12 includes sl-RelayUE-ConfigCommon, and if the U2N Relay UE threshold conditions as specified in 5.8.x2.2 are met; or
4> if the UE is selecting a U2N Relay UE/has a selected U2N Relay UE, and if SIB12 includes sl-RemoteUE-ConfigCommon, and if the U2N Remote UE threshold conditions as specified in 5.8.x3.2 are met:
5> initiate transmission of the SidelinkUEInformationNR message to indicate the NR sidelink relay discovery announcements resources required by the UE in accordance with 5.8.3.3;
2> else:
3> if the last transmission of the SidelinkUEInformationNR message included sl-TxResourceReqListDisc:
4> initiate transmission of the SidelinkUEInformationNR message to indicate it no longer requires NR sidelink relay discovery announcements resources in accordance with 5.8.3.3;
2> if configured by upper layer to transmit NR sidelink L2 U2N relay communication on the frequency included in sl-FreqInfoList in SIB12 of the PCell including sl-L2U2N-Relay or if configured by upper layer to transmit NR sidelink L3 U2N relay communication on the frequency included in sl-FreqInfoList in SIB12 of the PCell including sl-L3U2N-RelayDiscovery:
3> if the UE did not transmit a SidelinkUEInformationNR message since last entering RRC_CONNECTED state; or 3> if since the last time the UE transmitted a SidelinkUEInformationNR message the UE connected to a PCell not providing SIB12 including sl-ConfigCommonNR or connected to a PCell providing SIB12 but not including sl-L2U2N-Relay in case L2 U2N relay operation or connected to a PCell providing SIB12 but not including sl-L3U2N-RelayDiscovery in case of L3 U2N relay operation; or 3> if the last transmission of the SidelinkUEInformationNR message did not include sl-TxResourceReqListDisc; or if the information carried by the sl-TxResourceReqListDisc has changed since the last transmission of the SidelinkUEInformationNR message:

4> if the UE is (capable of) acting as U2N Relay UE, and if SIB12 includes sl-RelayUE-ConfigCommon, and if the U2N Relay UE threshold conditions as specified in 5.8.x2.2 are met; or 4> if the UE is selecting a U2N Relay UE/has a selected U2N Relay UE, and if SIB12 includes sl-RemoteUE-ConfigCommon, and if the U2N Remote UE threshold conditions as specified in 5.8.x3.2 are met:

5> initiate transmission of the SidelinkUEInformationNR message to indicate the NR sidelink relay discovery announcements resources required by the UE in accordance with 5.8.3.3;

2> else:

3> if the last transmission of the SidelinkUEInformationNR message included sl-TxResourceReqListDisc:

4> initiate transmission of the SidelinkUEInformationNR message to indicate it no longer requires NR sidelink relay discovery announcements resources in accordance with 5.8.3.3;

5.8.3.3 Actions Related to Transmission of SidelinkUE-InformationNR Message

The UE shall set the contents of the SidelinkUEInformationNR message as follows:

1> if the UE initiates the procedure to indicate it is (no more) interested to receive NR sidelink communication or to request (configuration/release) of NR sidelink communication transmission resources or to report to the network that a sidelink radio link failure or sidelink RRC reconfiguration failure has been declared or to indicate it is (no more) interested to receive NR sidelink discovery announcements or to request (configuration/release) of NR sidelink discovery announcements transmission resources or to request (configuration/release) of NR sidelink U2N relay communication transmission resources (i.e. UE includes all concerned information, irrespective of what triggered the procedure):

2> if SIB12 including sl-ConfigCommonNR is provided by the PCell:

3> if SIB12 including sl-NonRelayDiscovery and if configured by upper layers to receive NR sidelink non-relay discovery announcements, or if SIB12 including sl-L2U2N-Relay and if configured by upper layers to receive NR sidelink L2 U2N relay discovery announcements, or if SIB12 including sl-L3U2N-RelayDiscovery and if configured by upper layers to receive NR sidelink L3 U2N relay discovery announcements:

4> include sl-RxInterestedFreqListDisc and set it to the frequency for NR sidelink discovery announcements reception;

4> if the UE is capable of L2 U2N remote UE:

5> include sl-SourceIdentity-RemoteUE and set it to the source identity configured by upper layer for NR sidelink L2 U2N relay communication transmission;

3> if SIB12 including sl-NonRelayDiscovery and if configured by upper layers to transmit NR sidelink non-relay discovery announcements, or if SIB12 including sl-L2U2N-Relay and if configured by upper layers to transmit NR sidelink L2 U2N relay discovery announcements, or if SIB12 including sl-L3U2N-RelayDiscovery and if configured by upper layers to transmit NR sidelink L3 U2N relay discovery announcements:

4> include sl-TxResourceReqListDis and set its fields (if needed) as follows for each destination for which it requests network to assign NR sidelink discovery announcements resource:

5> set sl-DestinationIdentityDisc to the destination identity configured by upper layer for NR sidelink discovery announcements transmission;

5> if the UE is acting as L2 U2N Relay UE

6> set sl-SourceIdentity-RelayUE to the source identity configured by upper layer for NR sidelink L2 U2N relay discovery announcements transmission;

5> set sl-CastTypeDisc to the cast type of the associated destination identity configured by the upper layer for the NR sidelink discovery announcements transmission;

5> set sI-InterestedFreqListDisc to indicate the frequency of the associated destination for NR sidelink discovery announcements transmission;

5> set sl-TypeTxSyncListDisc to the current synchronization reference type used on the associated sI-InterestedFreqList for NR sidelink discovery announcements transmission;

5> set sl-DiscoveryType to the current discovery type of the associated destination identity configured by the upper layer for NR sidelink discovery announcements transmission;

3> if configured by upper layers to transmit NR sidelink L2 U2N relay communication and the UE is acting as L2 U2N Relay UE:

4> include sl-TxResourceReqL2U2N-Relay in sl-TxResourceReqListCommRelay and set its fields (if needed) as follows for each destination for which it requests network to assign NR sidelink L2 U2N relay communication resource:

5> set sl-DestinationIdentityL2U2N to the destination identity configured by upper layer for NR sidelink L2 U2N relay communication transmission;

5> set sl-TxInterestedFreqListL2U2N to indicate the frequency of the associated destination for NR sidelink L2 U2N relay communication transmission;

5> set sl-TypeTxSyncListL2U2N to the current synchronization reference type used on the associated sl-InterestedFreqListL2U2N for NR sidelink L2 U2N relay communication transmission;

5> set sl-LocalID-Request to request local ID for L2 U2N Remote UE;

5> set sl-PagingIdentity-RemoteUE to the paging UE ID received from peer L2 U2N Remote UE;

5> set sl-CapabilityInformationSidelink to include UECapabilityInformationSidelink message, if any, received from peer UE.

4> include ue-Type and set it to relayUE;

3> if configured by upper layers to transmit NR sidelink L2 U2N relay communication and the UE has a selected L2 U2N Relay UE:

4> include sl-TxResourceReqL2U2N-Relay in sl-TxResourceReqListCommRelay and set its fields (if needed) as follows to request network to assign NR sidelink L2 U2N relay communication resource:

5> set sl-TxInterestedFreqListL2U2N to indicate the frequency of the associated destination for NR sidelink L2 U2N relay communication transmission;

5> set sl-TypeTxSyncListL2U2N to the current synchronization reference type used on the associated sl-InterestedFreqListL2U2N for NR sidelink L2 U2N relay communication transmission;

5> set sl-CapabilityInformationSidelink to include UECapabilityInformationSidelink message, if any, received from peer UE.

4> include ue-Type and set it to remoteUE;

3> if configured by upper layers to transmit NR sidelink L3 U2N relay communication:

4> include sl-TxResourceReqL3U2N-Relay in sl-TxResourceReqListCommRelay and set its fields (if needed) as follows for each destination for which it requests network to assign NR sidelink L3 U2N relay communication resource:

5> set sl-DestinationIdentity to the destination identity configured by upper layer for NR sidelink L3 U2N relay communication transmission;

5> set sl-CostType to the cast type of the associated destination identity configured by the upper layer for the NR sidelink L3 U2N relay communication transmission;

5> set sl-RLC-ModeIndication to include the RLC mode(s) and optionally QoS profile(s) of the sidelink QoS flow(s) of the associated RLC mode(s), if the associated bi-directional sidelink DRB has been established due to the configuration by RRCReconfigurationSidelink;

5> set sl-QoS-InfoList to include QoS profile(s) of the sidelink QoS flow(s) of the associated destination configured by the upper layer for the NR sidelink L3 U2N relay communication transmission;

5> set sl-TxInterestedFreqList to indicate the frequency of the associated destination for NR sidelink L3 U2N relay communication transmission;

5> set sl-TypeTxSyncList to the current synchronization reference type used on the associated sl-InterestedFreqList for NR sidelink L3 U2N relay communication transmission.

5> set sl-CapabilityInformationSidelink to include UECapabilityInformationSidelink message, if any, received from peer UE.

4> include ue-Type and set it to relayUE if the UE is acting as NR sidelink L3 U2N Relay UE and to remoteUE otherwise;

[ . . . ]

1> else:

2> submit the SidelinkUEInformationNR message to lower layers for transmission.

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE
RRCReconfiguration Message
-- ASN1START
-- TAG-RRCRECONFIGURATION-START
. . .
RRCReconfiguration-v17xx-IEs ::=SEQUENCE {
    sl-L2RelayUE-Config-r17    SetupRelease    {SL-L2RelayUEConfig-r17}
OPTIONAL, Cond L2RelayUE
    sl-L2RemoteUEConfig-r17    SetupRelease    {SL-L2RemoteUEConfig-r17}
OPTIONAL, Cond L2RemoteUE
    dedicatedPagingDelivery-r17 OCTET STRING (CONTAINING Paging)
OPTIONAL, L2U2NRelay
. . .
    nonCriticalExtension SEQUENCE { }
OPTIONAL
}
-- TAG-RRCRECONFIGURATION-STOP
-- ASN1STOP

| RRCReconfiguration-IEs field descriptions |
| --- |
| sl-L2RelayUEConfig |
| Contains L2 U2N relay operation related configurations used by L2 U2N Relay UE. |
| sl-L2RemoteUEConfig |
| Contains L2 U2N relay operation related configurations used by L2 U2N Remote UE. |

| Conditional Presence | Explanation |
| --- | --- |
| L2RelayUE | For L2 U2N Relay UE, the field is optionally present, Need M. Otherwise, it is absent. |
| L2RemoteUE | The field is optional present for L2 U2N Remote UE, need M; otherwise it is absent. |
| L2U2N Relay | For L2 U2N Relay UE, the field is optionally present, Need N. Otherwise, it is absent. |

SL-L2RelayUEConfig

The IE SL-L2RelayUEConfig is used to configure L2 U2N relay operation related configurations used by L2 U2N Relay UE, e.g. SRAP-Config.

SL-L2RelayUEConfig information element

```
-- ASN1START
-- TAG-SL-L2RELAYUECONFIG-START
SL-L2RelayUEConfig-r17 ::=SEQUENCE {
    sl-RemoteUE-ToAddModList-r17      ::=SEQUENCE
        (SIZE (1 . . . maxRemoteUE)) OF SL-RemoteUE-
        ToAddMod-r17 OPTIONAL, -- Need M
    sl-RemoteUE-ToReleaseList-r17     ::=SEQUENCE
        (SIZE (1 . . . maxRemoteUE)) OF SL-Destination-
        Identity-r16 OPTIONAL, -- Need M
    . . .
}
SL-RemoteUE-ToAddMod-r17::=SEQUENCE {
    sl-L2Identity-Remote-r17 SL-DestinationIdentity-r16,
    sl-SRAP-Config-Relay-r17 SL-SRAP-Config-r17
OPTIONAL, -- L2RelayUE
    . . .
}
-- TAG-SL-L2RELAYUECONFIG-STOP
-- ASN1STOP
```

| SL-L2RelayUEConfig field descriptions |
|---|
| sl-RemoteUE-ToAddModList |
| List of L2 U2N Remote UEs to be added and modified. |
| sl-RemoteUE-ToReleaseList |
| List of L2 U2N Remote UEs to be released. |

SL-L2RemoteUEConfig

The IE SL-L2RemoteUEConfig is used to L2 U2N relay operation related configurations used by L2 U2N Remote UE, e.g. SRAP-Config.

SL-L2RemoteUEConfig Information Element

```
-- ASN1START
-- TAG--L2REMOTEUECONFIG-START
SL-L2RemoteUEConfig-r17 ::=SEQUENCE {
    sl-SRAP-Config-Remote-r17    SL-SRAP-Config-r17
        OPTIONAL, --Need M
    sl-ServingCellInfo-r17       SL-ServingCellInfo-r17
        OPTIONAL, Cond RRCEstabAndHO
    . . .
}
-- TAG-SL-L2REMOTEUECONFIG-STOP
-- ASN1STOP
```

| SL-L2RemoteUEConfig field descriptions |
|---|
| sl-SRAP-Config-Remote |
| Indicates SRAP configuration used for L2 U2N Remote UE. |
| sl-ServingCellInfo |
| Indicates the Uu serving Cell related information. |

SL-SRAP-Config

The IE SL-SRAP-Config is used to set the configurable SRAP parameters used by L2 U2N Relay UE and L2 U2N Remote UE as specified in TS 38.351 [x2].

SL-SRAP-Config Information Element

```
-- ASN1START
-- TAG-SL-SRAP-CONFIG-START
SL-SRAP-Config-r17 ::=SEQUENCE {
    sl-LocalIdentity-r17  INTEGER  (0 . . . 255)
        OPTIONAL, -- Need M
    sl-MappingToAddModList-r17  SEQUENCE (SIZE
        (1 . . . maxLC-ID)) OF SL-MappingToAddMod-r17
        OPTIONAL, -- Need M
    sl-MappingToReleaseList-r17  SEQUENCE (SIZE
        (1 . . . maxLC-ID)) OF SL-RemoteUE-RB-Identity-
        r17 OPTIONAL, -- Need M
SL-MappingToAddMod-r17 ::=SEQUENCE {
    sl-RemoteUE-RB-Identity-r17    SL-RemoteUE-RB-
        Identity-r17,
    sl-Egress-RLC-Channel-Uu-r17 Uu-Relay-RLC-Chan-
        nelID-r17 OPTIONAL, L2RelayUE
    sl-Egress-RLC-Channel-PC5 -r17  SL-RLC-Channe-
        lID-r17 OPTIONAL, Need N
    . . .
}
SL-RemoteUE-RB-Identity-r17 ::=CHOICE {
    srb-Identity-r17 INTEGER (0 . . . ),
    drb-Identity-r17 DRB-Identity,
    . . .
}
-- TAG-SL-SRAP-CONFIG-STOP
-- ASN1STOP
```

| SL-SRAP-Config field descriptions |
|---|
| sl-LocalIdentity |
| Indicates the local UE ID of the L2 U2N Remote UE used in SRAP as specified in TS 38.351 [x2]. |
| SL-MappingToAddModList |
| Indicates the list of mapping between the bearer identity of the L2 U2N Remote UE and the egress RLC channel as specified in TS 38.351 [x2]. |
| SL-MappingToReleaseList |
| Indicates the list of mapping to be released. |
| sl-RemoteUE-RB-Identity |
| Identity of the end-to-end Uu bearer identity of the L2 U2N Remote UE. |
| sl-Egress-RLC-Channel-Uu |
| Indicates the egress RLC channel on Uu Hop. |
| sl-Egress-RLC-Channel-PC5 |
| Indicates the egress RLC channel on PC5 Hop. |

| Conditional Presence | Explanation |
|---|---|
| L2RelayUE | For L2 U2N Relay UE, the field is optionally present, Need M. Otherwise, it is absent. |

3GPP R2-2203947 introduces Sidelink Relay to NR Rel-17 in TS 38.351. The related procedures are described below:

4.2 SRAP Architecture 4.2.1 General

This clause describes a model of the SRAP, i.e., it does not specify or restrict implementations.

4.2.2 SRAP Entities

FIG. 4.2.2-1 represents one possible structure for the SRAP sublayer. The figure is based on the radio interface protocol architecture defined in TS 38.300 [2].

On the U2N Relay UE, the SRAP sublayer contains one SRAP entity at Uu interface and a separate collocated SRAP entity at the PC5 interface. On the U2N Remote UE, the SRAP sublayer contains only one SRAP entity at the PC5 interface.

Each SRAP entity has a transmitting part and a receiving part. Across the PC5 interface, the transmitting part of the SRAP entity at the U2N Remote UE has a corresponding receiving part of an SRAP entity at the U2N Relay UE, and vice-versa. Across the Uu interface, the transmitting part of the SRAP entity at the U2N Relay UE has a corresponding receiving part of an SRAP entity at the gNB, and vice-versa.

FIG. 4.2.2-2 and FIG. 4.2.2-3 represents the functional view of the SRAP entity for the SRAP sublayer at PC5 interface and at Uu interface respectively.

Figure 13:
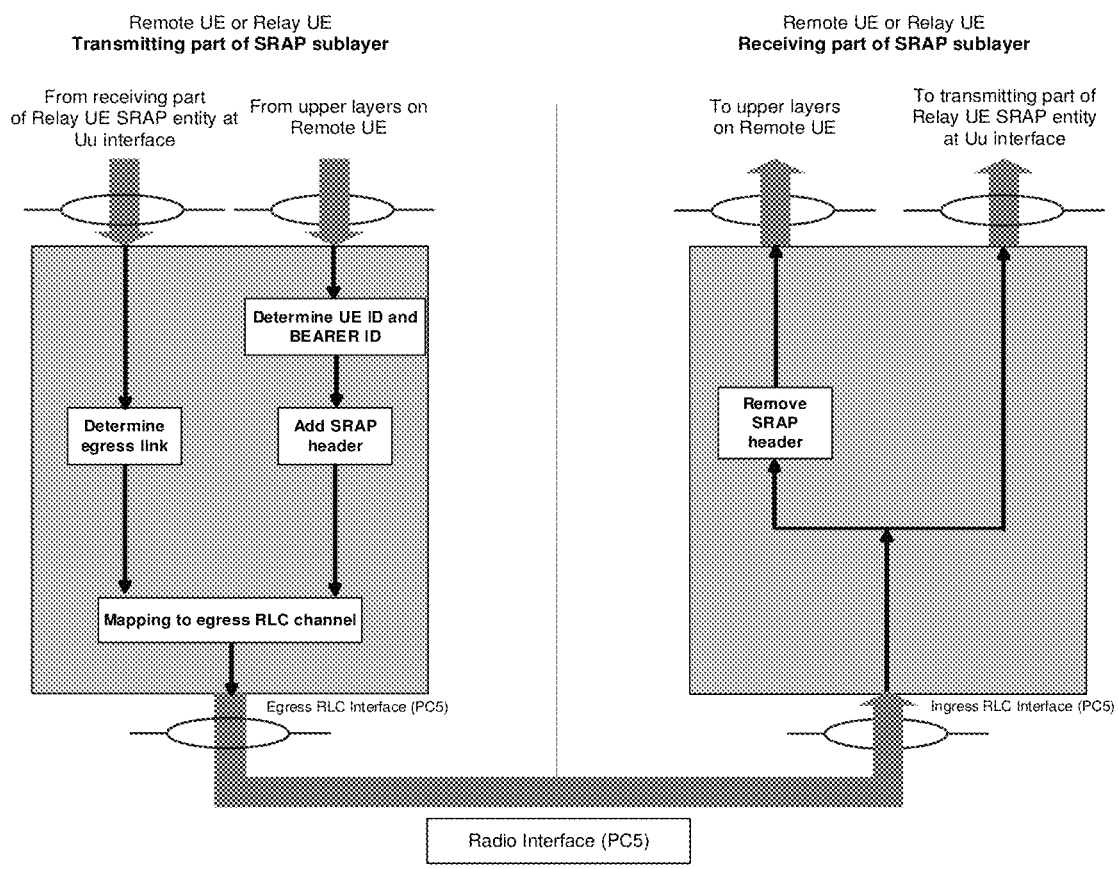
FIG. 13 is a reproduction of FIG. 4.2.2-2 of 3GPP R2-2203947.

[FIG. 4.2.2-2 of 3GPP R2-2203947, Entitled "Example of Functional View of SRAP Sublayer at PC5 Interface", is Reproduced as FIG. 13]

Figure 14:
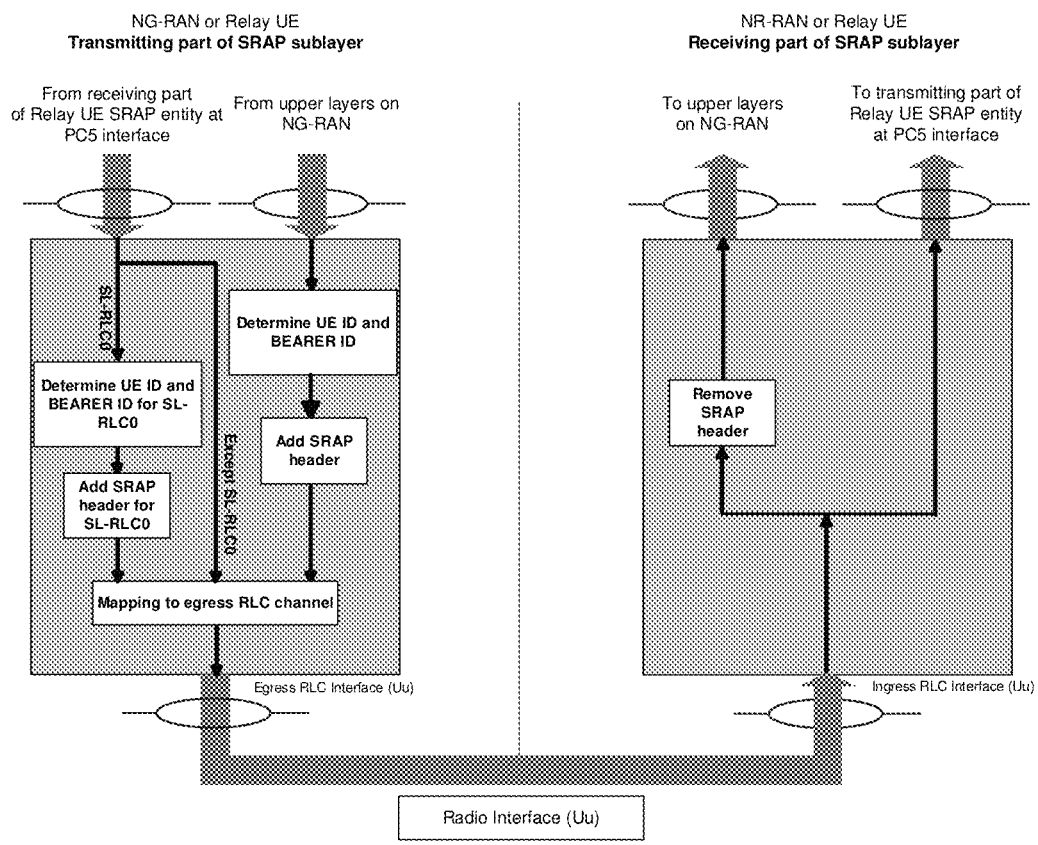
FIG. 14 is a reproduction of FIG. 4.2.2-3 of 3GPP R2-2203947.

[FIG. 4.2.2-3 of 3GPP R2-2203947, Entitled "Example of Functional View of SRAP Sublayer at Uu Interface]", is Reproduced as FIG. 14]

In the example of FIG. 4.2.2-2 and FIG. 4.2.2-3, at relay UE,

The receiving part on the SRAP entity of Uu interface delivers SRAP PDUs to the transmitting part on the collocated SRAP entity of PC5 interface, and the receiving part on the SRAP entity of PC5 interface delivers SRAP PDUs to the transmitting part on the collocated SRAP entity of Uu interface, except for data packet received from SL-RLC0 as specified in TS 38.331 [3]. As an alternative mode, the receiving part may deliver SRAP SDUs to the collocated transmitting part. When passing SRAP SDUs, the receiving part removes the SRAP header and the transmitting part adds the SRAP header with the same SRAP header content as carried on the SRAP PDU header prior to removal. Passing SRAP SDUs in this manner is therefore functionally equivalent to passing SRAP PDUs, in implementation. The following specification therefore refers to the passing of SRAP Data Packets in supporting the alternative mode.

For data packet received from SL-RLC0 as specified in TS 38.331 [3], the receiving part on the SRAP entity of PC5 interface delivers SRAP SDUs to the collocated transmitting part on the collocated SRAP entity of Uu interface, and the transmitting part adds the SRAP header in accordance with clause 5.3.3.

4.3 Services 4.3.1 Services Provided to Upper Layers

The following services are provided by the SRAP sublayer to upper layers:

Data transfer.

4.3.2 Services Expected from Lower Layers

An SRAP sublayer expects the following services from lower layers per RLC entity (for a detailed description see TS 38.322 [4]):

Acknowledged data transfer service;

Unacknowledged data transfer service.

4.4 Functions

The SRAP sublayer supports the following functions:

Data transfer;

Determination of UE ID and BEARER ID for packets received from collocated SRAP entity;

Determination of egress link;

Determination of egress RLC channel;

4.5 Configurations

The configuration of the SRAP entity for U2N Remote UE includes:

Mapping from a radio bearer identified by BEARER ID to egress PC5 RLC channel via RRC.

The local identity via RRC.

The configuration of the SRAP entity for U2N Relay UE includes:

The local identity for each U2N Remote UE via RRC.

Mapping from UE ID and BEARER ID to egress Uu RLC channel for each U2N Remote UE via RRC.

Mapping from UE ID and BEARER ID to egress PC5 RLC channel for each U2N Remote UE via RRC.

5 Procedures 5.1 SRAP Entity Handling 5.1.1 SRAP Entity Establishment

When upper layers request establishment of an SRAP entity, UE shall:

establish an SRAP entity;

follow the procedures in clause 5.

5.1.2 SRAP Entity Release

When upper layers request release of an SRAP entity, UE shall:

release the SRAP entity and the related SRAP configurations.

5.2 DL Data Transfer 5.2.1 Receiving Operation of U2N Relay UE

Upon receiving an SRAP Data PDU from lower layer, the receiving part of the SRAP entity on the Uu interface of U2N Relay UE shall:

deliver the SRAP Data Packet to the transmitting part of the collocated SRAP entity on the PC5 interface.

5.2.2 Transmitting Operation of U2N Relay UE

The transmitting part of the SRAP entity on the PC5 interface of U2N Relay UE receives SRAP Data Packets from the receiving part of the SRAP entity on the Uu interface of the same U2N Relay UE.

When the transmitting part of the SRAP entity on the PC5 interface has an SRAP Data PDU to transmit, the transmitting part of the SRAP entity on the PC5 interface shall:

Determine the egress link in accordance with clause 5.2.2.1;

Determine the egress RLC channel in accordance with clause 5.2.2.2;

Submit this SRAP Data PDU to the determined egress RLC channel of the determined egress link.

5.2.2.1 Egress Link Determination

For a SRAP Data PDU to be transmitted, SRAP entity shall:

if there is an entry in sl-SRAP-Config-Relay, whose sl-LocalIdentity matches the UE ID field in SRAP Data PDU:

Determine the egress link on PC5 interface corresponding to sl-L2Identity-Remote configured for the concerned sl-LocalIdentity as specified in TS 38.331 [3];

5.2.2.2 Egress RLC Channel Determination

For a SRAP Data PDU to be transmitted, the SRAP entity shall:

if the BEARER ID of the SRAP Data PDU is 0:

Determine the egress PC5 RLC channel in the determined egress link corresponding to logicalChannelIdentity for SL-RLC0 as specified in TS 38.331 [3];

else if there is an entry in sl-SRAP-Config-Relay, whose sl-LocalIdentity matches the UE ID field in SRAP Data PDU, which includes an sl-RemoteUE-RB-Identity that matches the SRB identity or DRB identity of the SRAP Data PDU determined by the BEARER ID field (SRB and DRB are differentiated based on sl-Egress-RLC-Channel-Uu), Determine the egress PC5 RLC channel in the determined egress link corresponding to sl-Egress-RLC-Channel-PC5 configured for the concerned sl-LocalIdentity and concerned sl-RemoteUE-RB-Identity as specified in TS 38.331 [3];

5.2.3 Receiving Operation of U2N Remote UE

Upon receiving an SRAP Data PDU from lower layer, the receiving part of the SRAP entity shall:
remove the SRAP header of this SRAP Data PDU and deliver the SRAP SDU to upper layer, i.e., PDCP layer (TS 38.323 [5]), entity corresponding to the BEARER ID of this SRAP Data PDU (SRB and DRB are differentiated based on sl-Egress-RLC-Channel-PC5);

5.3 UL Data Transfer 5.3.1 Transmitting Operation of U2N Remote UE

The transmitting part of the SRAP entity on the PC5 interface of U2N Remote UE can receive SRAP Data SDU from upper layer, and construct SRAP Data PDUs as needed (see clause 4.2.2). Upon receiving a SRAP SDU from upper layer, the transmitting part of the SRAP entity on the PC5 interface shall:
if the SRAP SDU is not for SRB0:
Determine the UE ID and BEARER ID field in accordance with clause 5.3.1.1;
Construct an SRAP Data PDU by adding an SRAP header to the SRAP SDU, where the UE ID field and BEARER ID field is set to the determined value, in accordance with clause 6.2.2;
Determine the egress RLC channel in accordance with clause 5.3.1.2;
Submit this SRAP Data PDU to the determined egress RLC channel.

5.3.1.1 UE ID and BEARER ID Field Determination

For a SRAP SDU received from upper layer, the SRAP entity shall:
Determine the UE ID corresponding to sl-LocalIdentity, configured as specified in TS 38.331 [3];
Determine the BEARER ID corresponding to SRB identity for SRB (i.e., set the BEARER ID field to srb-Identity), or corresponding to DRB identity minus 1 for DRB (i.e., "set the BEARER ID field to drb-Identity minus 1), from which the SRAP SDU is received, configured as specified in TS 38.331 [3];

5.3.1.2 Egress RLC Channel Determination

For a SRAP Data PDU to be transmitted, the SRAP entity shall:
if the SRAP SDU is for SRB0:
Determine the egress PC5 RLC channel in the determined egress link corresponding to logicalChannelIdentity for SL-RLC0 as specified in TS 38.331 [3];
else if there is an entry in sl-SRAP-Config-Remote, whose sl-RemoteUE-RB-Identity matches the SRB identity or DRB identity of the SRAP Data PDU,
Determine the egress PC5 RLC channel of the link with U2N Relay UE corresponding to sl-Egress-RLC-Channel-PC5 configured for the concerned sl-RemoteUE-RB-Identity as specified in TS 38.331 [3];

5.3.2 Receiving Operation of U2N Relay UE

Upon receiving an SRAP Data Packet from lower layer, the receiving part of the SRAP entity on the PC5 interface shall:
deliver the SRAP Data Packet to the transmitting part of the collocated SRAP entity.

5.3.3 Transmitting Operation of U2N Relay UE

The transmitting part of the SRAP entity on the Uu interface of U2N Relay UE can receive SRAP Data Packets from the receiving part of the SRAP entity on the PC5 interface of the same U2N Relay UE, and construct SRAP Data PDUs as needed (see clause 4.2.2).

Upon receiving SRAP Data packet from the collocated SRAP entity, the transmitting part of the SRAP entity on the Uu interface shall:
if the SRAP Data packet is received from SL-RLC0 as specified in TS 38.331 [3]:
Determine the UE ID and BEARER ID field in accordance with clause 5.3.3.1, for SRAP Data packet;
Construct an SRAP Data PDU by adding an SRAP header to the SRAP SDU, where the UE ID field and BEARER ID field is set to the determined value, in accordance with clause 6.2.2, for SRAP Data packet;
Determine the egress RLC channel in accordance with clause 5.3.3.2;
Submit this SRAP Data PDU to the determined egress RLC channel.

5.3.3.1 UE ID and BEARER ID Field Determination

For an SRAP Data SDU received from SL-RLC0 as specified in TS 38.331 [3], the SRAP entity shall:
if there is an entry in sl-RemoteUE-ToAddModList, whose sl-L2Identity-Remote matches the Layer-2 ID of the remote UE from which the SRAP Data packet is received,
Determine the UE ID corresponding to sl-LocalIdentity configured for the concerned sl-L2Identity-Remote as specified in TS 38.331 [3];
Determine the BEARER ID as 0 (i.e., set BEARER ID field as 0), configured as specified in TS 38.331 [3];

5.3.3.2 Egress RLC Channel Determination

For a SRAP Data PDU to be transmitted, the SRAP entity shall:
if there is an entry in sl-SRAP-Config-Relay, whose sl-LocalIdentity matches the UE ID field in SRAP Data PDU, and which includes an sl-RemoteUE-RB-Identity matches SRB identity or DRB identity of the SRAP Data PDU determined by the BEARER ID field (SRB and DRB are differentiated based on sl-Egress-RLC-Channel-PC5),
Determine the egress Uu RLC channel corresponding to sl-Egress-RLC-Channel-Uu configured for the concerned sl-LocalIdentity and concerned sl-RemoteUE-RB-Identity as specified in TS 38.331 [3];

5.4 Handling of Unknown, Unforeseen, and Erroneous Protocol Data

When a SRAP Data PDU that contains a UE ID or BEARER ID which is not included in sl-SRAP-Config-Remote (for Remote UE) or sl-SRAP-Config-Relay (for Relay UE) is received, the SRAP entity shall:
discard the received SRAP Data PDU.

6 Protocol Data Units, Formats, and Parameters 6.1 Protocol Data Units 6.1.1 Data PDU The SRAP Data PDU is used to convey one of the following in addition to the PDU header:
upper layer data.

6.2 Formats 6.2.1 General

An SRAP PDU is a bit string that is byte aligned (i.e. multiple of 8 bits) in length. The formats of SRAP PDUs are described in clause 6.2.2 and their parameters are described in clause 6.3.

6.2.2 Data PDU

FIG. 6.2.2-1 shows the format of the SRAP Data PDU.

[FIG. 6.2.2-1 of 3GPP R2-2203947, Entitled "SRAP Data PDU Format", is Reproduced as FIG. 15]

6.3 Parameters 6.3.1 General

If not otherwise mentioned in the definition of each field then the bits in the parameters shall be interpreted as follows: the left most bit string is the first and most significant and the right most bit is the last and least significant bit.

Unless otherwise mentioned, integers are encoded in standard binary encoding for unsigned integers. In all cases the bits appear ordered from MSB to LSB when read in the PDU.

6.3.2 UE ID

Length: 8 bits.

This field carries local identity of U2N Remote UE.

6.3.3 BEARER ID

Length: 5 bits.

This field carries Uu radio bearer identity for U2N Remote UE.

6.3.4 Data

Length: Variable

This field carries the SRAP SDU (i.e. PDCP PDU).

6.3.5 R

Length: 1 bit

Reserved. In this release, reserved bits shall be set to 0. Reserved bits shall be ignored by the receiver.

6.3.6 D/C

Length: 1 bit

This field indicates whether the corresponding SRAP PDU is an SRAP Data PDU or an SRAP Control PDU (not used in this release).

[Table 6.3.6-1 of 3GPP R2-2203947, Entitled "D/C Field", is Reproduced as FIG. 16]

3GPP TS 23.304 describes support of UE-to-Network Relay in the following release (i.e. Release 17), which means a relay UE will be used to support communication between a remote UE and the network in case the remote UE cannot access the network directly. There are two different types of solutions for UE-to-Network (U2N) Relay i.e. a Layer-2 (based) U2N Relay and a Layer-3 (based) U2N Relay.

FIG. 6.5.2.1-1 (not shown in the present application) of 3GPP TS.304 V17.0.0 describes connection establishment for 5G ProSe Layer-2 UE-to-Network Relay. After the initial registration and service authorization retrieval are performed by the remote UE when it is in coverage, the remote UE may perform UE-to-Network Relay discovery and selection if there is a request for a connectivity service from the upper layers or an upper layer application. Both Model A discovery and Model B discovery are supported for the remote UE to discover a U2N Relay. Model A uses a single discovery protocol message (i.e. Discovery Announcement) and Model B uses two discovery protocol messages (i.e. Discovery Solicitation and Discovery Response). A Relay Service Code (RSC) is included in the 5G ProSe UE-to-Network Relay discovery to indicate the connectivity service which a relay UE provides to the remote UE or the remote UE requests from the relay UE. The RSCs are configured to the relay UE and the remote UE as according to clause 5.1.4 of 3GPP TS.304 V17.0.0. A relay UE supporting multiple RSCs can advertise the RSCs using multiple discovery messages, with one RSC per discovery message. A remote UE may monitor announcement messages with a RSC corresponding to a desired connectivity service. In case there are multiple relay UEs in proximity of the remote UE, one of the relay UEs may be selected based on e.g. the RSCs included in the discovery messages and measurement results on the discovery messages transmitted by relay UEs.

After selecting a suitable relay UE, the remote UE may then establish a PC5 unicast link (or a PC5-RRC connection) with the relay UE to support U2N Relay operation. The remote UE may include the RSC in a Direct Communication Request message transmitted to the relay UE for establishing the PC5 unicast link. The Direct Communication Request message could be transmitted by the remote UE using the Layer-2 ID of the remote UE as a source ID and a Layer-2 ID of the relay UE as a destination ID. Besides, the Direct Communication Request message may include Source User Info indicating the identity of the remote UE requesting relay operation and thus the relay UE can know whether the same remote UE requests for two separate PC5 unicast link establishments with the relay UE. The remote UE may acquire the Layer-2 ID of the relay UE when receiving the UE-to-Network Relay discovery message from the relay UE. After the PC5 unicast link has been established, the remote UE may then establish a RRC Connection with the same NG-RAN (i.e. gNB) serving the selected relay UE and set up a NAS connection with the serving AMF. Finally, the remote UE may establish a PDU session with the network (i.e. UPF) to get the desired connectivity service provided by a data network. The relay UE may forward all the service data between the remote UE and the NG-RAN.

The protocol stacks for the user plane and control plane of L2 U2N Relay architecture are presented in 3GPP running CR for TS 38.300 (as captured in 3GPP R2-220wxyz). The SRAP sublayer is placed above the RLC sublayer for both CP and UP at both PC5 interface and Uu interface. The Uu Service Data Adaptation Protocol (SDAP), Packet Data Convergence Protocol (PDCP), and Radio Resource Control (RRC) are terminated between L2 U2N Remote UE and gNB, while SRAP, RLC, Medium Access Control (MAC), and Physical (PHY) are terminated in each hop (i.e. the link between L2 U2N Remote UE and L2 U2N Relay UE and the link between L2 U2N Relay UE and the gNB).

According to 3GPP R2-2203947 (running CR of TS 38.351) in the case of Uplink (UL) Data transfer, the transmitting part of the SRAP entity on the PC5 interface of U2N Remote UE can receive SRAP Data Service Data Unit (SDU) from upper layer, and can construct an SRAP Data PDU as needed. If the SRAP Data SDU is not for SRB0, the U2N remote UE determines the UE ID and BEARER ID field and constructs an SRAP Data PDU by adding an SRAP header to the SRAP Data SDU, where the UE ID field and BEARER ID field are set to the determined values. And then, the transmitting part of the SRAP entity on the PC5 interface of the U2N Remote UE determines the egress RLC channel and submits this SRAP Data PDU to lower layer for transmission to the U2N Relay UE on the determined egress RLC channel.

In the U2N Relay UE side, upon receiving an SRAP Data Packet (e.g. an SRAP Data PDU or an SRAP Data SDU) from lower layer, the receiving part of the SRAP entity on the PC5 interface of the U2N Relay UE could deliver the SRAP Data Packet to the transmitting part of the collocated SRAP entity on the Uu interface of the U2N Relay UE. After receiving SRAP Data Packets from the receiving part of the SRAP entity on the PC5 interface of the U2N Relay UE, the transmitting part of the SRAP entity on the Uu interface could construct SRAP Data PDUs as needed. The transmitting part of the SRAP entity on the Uu interface of the U2N Relay UE could then determine the egress RLC channel and submits this SRAP Data PDU to lower layer for transmission to gNB on the determined egress RLC channel.

Subclause 5.4 of 3GPP R2-2203947 provides the following description for the receiving part of the SRAP entity on the PC5 interface of the U2N Relay UE to discard a SRAP Data PDU if it is considered as invalid according to the UE ID or BEARER ID included in the SRAP Data PDU, when the SRAP Data PDU is received:

---

When a SRAP Data PDU that contains a UE ID or BEARER ID which is not included in sl-SRAP-Config-Remote (for Remote UE) or sl-SRAP-Config-Relay (for Relay UE) is received, the SRAP entity shall:
- discard the received SRAP Data PDU.

---

In case of direct-to-indirect path switching for U2N Relay UE in RRC_IDLE/INACTIVE, the U2N remote UE receives a path switch command (i.e. the RRCReconfiguration message including sl-PathSwitchConfig) from gNB. And, the U2N Remote UE establishes a PC5 connection with a target relay UE (as indicated in the path switch command) and then sends a first SRAP Data PDU (including an SRB1 message i.e. RRCReconfigurationComplete message to be sent to gNB) via SL-RLC1 to the target relay UE for forwarding to the gNB by the target relay UE.

Figure 17:
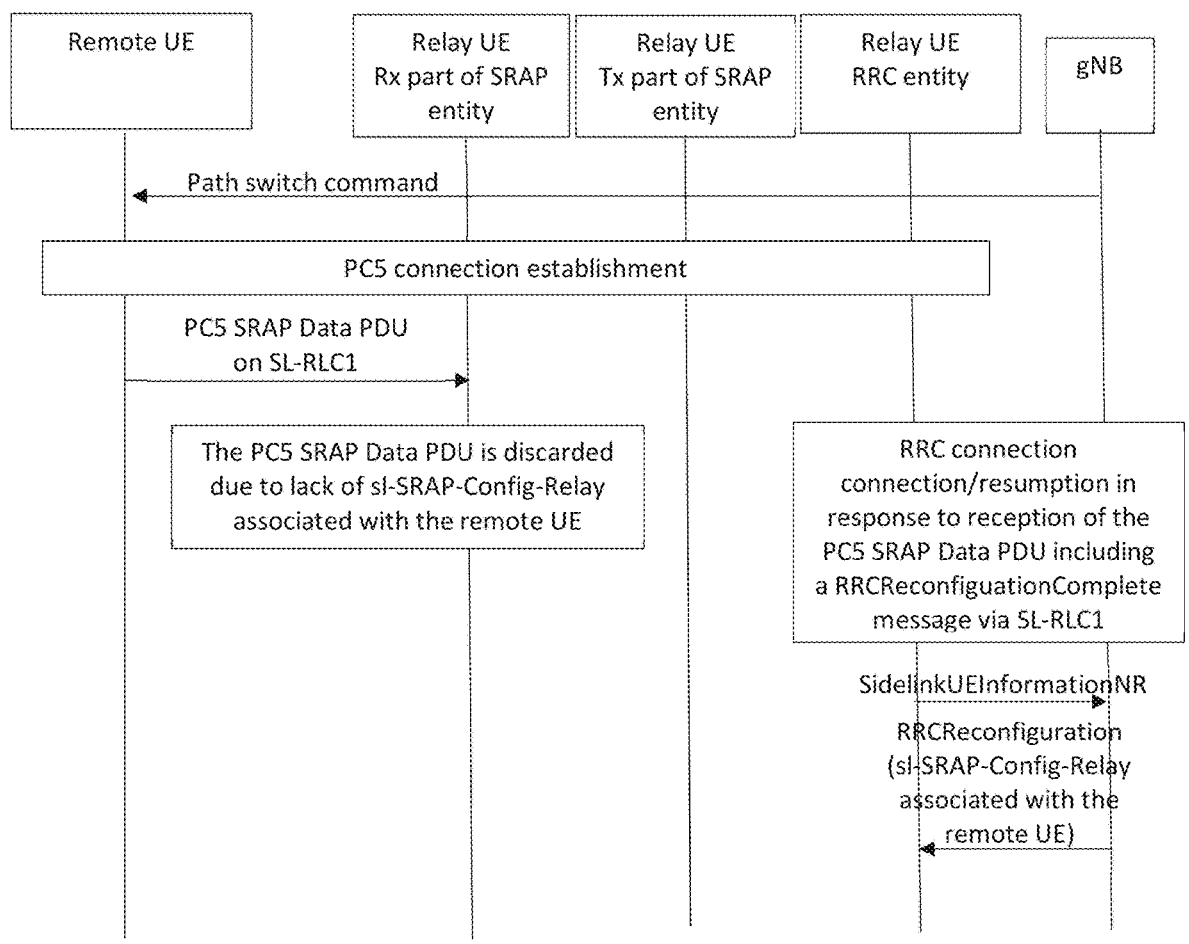
FIG. 17 is a messaging diagram according to one exemplary embodiment.

Since the target relay UE is in RRC_IDLE/INACTIVE, the target relay UE needs to enter RRC_CONNECTED first and then sends a SidelinkUEInformation (SUI) message to gNB in order for receiving the sl-SRAP-Config-Relay from gNB. Thus, the sl-SRAP-Config-Relay associated with the remote UE is not yet available when the target relay UE receives the RRCReconfigurationComplete message from the remote UE. In this situation, the target relay UE will discard the first SRAP Data PDU (i.e. the RRCReconfigurationComplete message) received from the U2N Remote UE via SL-RLC1 because it is considered as an invalid SRAP Data PDU according to subclause 5.4 of 3GPP R2-2203947. As a result, the U2N Remote UE would fail to complete the procedure of direct-to-indirect path switching because the gNB cannot receives the RRCReconfigurationComplete message. The U2N Remote UE may then initiate a RRC connection re-establishment procedure, that would cause connectivity service interruption. This issue is illustrated in FIG. 17, which shows an exemplary issue of direct-to-indirect path switching.

Figure 18:
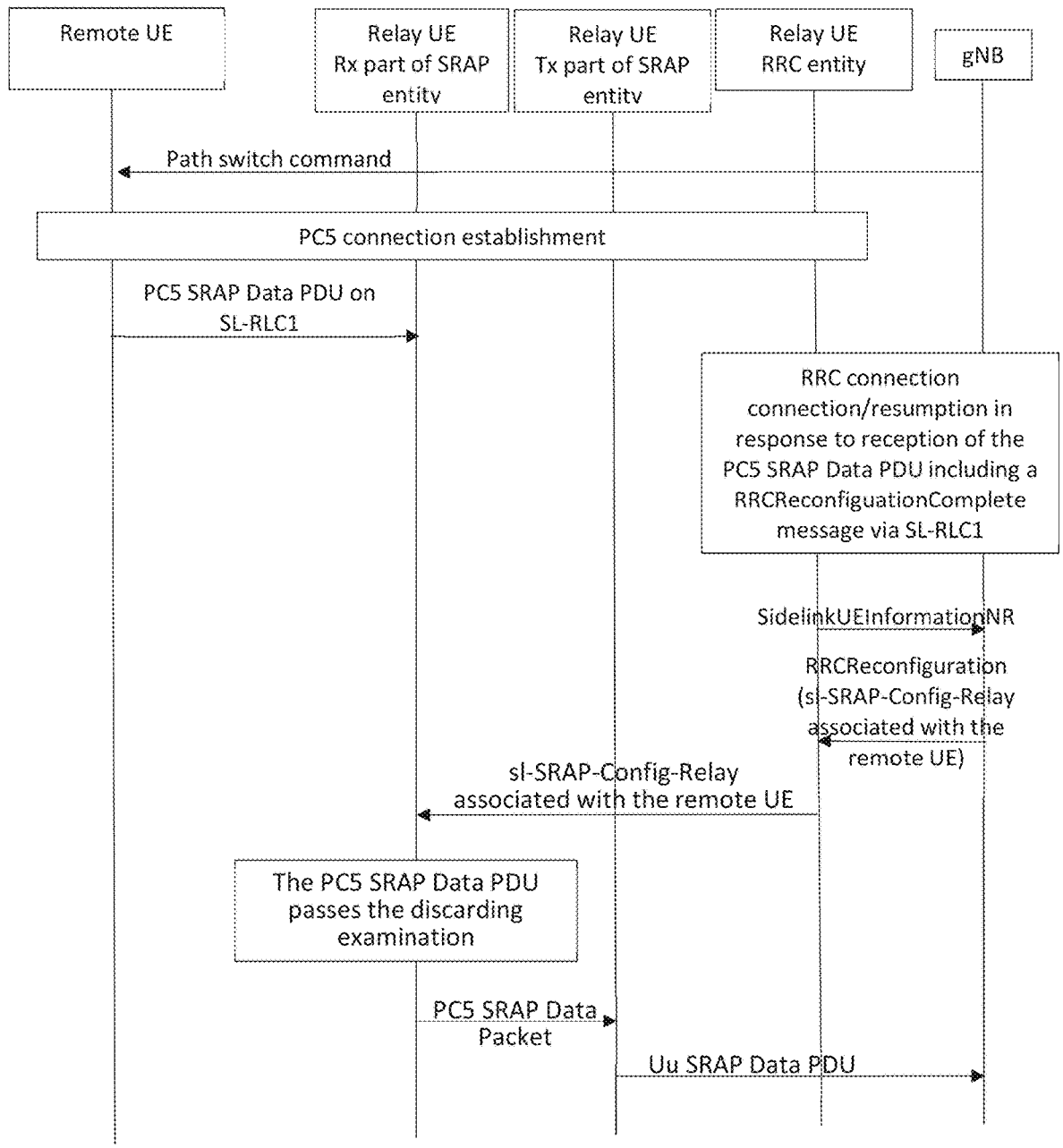
FIG. 18 is a messaging diagram according to one exemplary embodiment.

To solve the above issue, one potential solution is for the U2N Relay UE to perform the discarding examination for an SRAP Data PDU received from a remote UE if or when a relay SRAP configuration (e.g. sl-SRAP-Config-Relay) associated with the remote UE has been configured by or is received from gNB or is available on the U2N Relay UE as illustrated in FIG. 18, which shows an exemplary solution for direct-to-indirect path switching according to one embodiment. An example of text proposal on subclause 5.4 of 3GPP R2-2203947 may be as follows:

---

5.4 Handling of unknown, unforeseen, and erroneous protocol data

For a SRAP Data PDU that is received from a remote UE and contains a UE ID or BEARER ID which is not included in sl-SRAP-Config-Remote (for Remote UE) or sl-SRAP-Config-Relay associated with the remote UE (for Relay UE), the SRAP entity shall:
- discard the received SRAP Data PDU.

---

The phrase "sl-SRAP-Config-Relay associated with the remote UE" in the above text proposal implies the sl-SRAP-Config-Relay for the remote UE has been configured by gNB.

Another example of text proposal for subclause 5.4 of 3GPP R2-2203947 may be as follows:

---

5.4 Handling of unknown, unforeseen, and erroneous protocol data

When a SRAP Data PDU of a remote UE that contains a UE ID or BEARER ID which is not included in sl-SRAP-Config-Remote (for Remote UE) or sl-SRAP-Config-Relay (for Relay UE) is received and the sl-SRAP-Config-Remote or the sl-SRAP-Config-Relay for the remote UE has been configured, the SRAP entity shall:
- discard the received SRAP Data PDU.

---

It is also feasible for the U2N Relay UE to exclude the (very) first SRAP Data PDU (i.e. the RRCReconfigurationComplete message), received from the U2N Remote UE via SL-RLC1, from discarding examination. An example of the text proposal on subclause 5.4 of 3GPP R2-2203947 may be as follows:

---

5.4 Handling of unknown, unforeseen, and erroneous protocol data

When a SRAP Data PDU that contains a UE ID or BEARER ID which is not included in sl-SRAP-Config-Remote (for Remote UE) or sl-SRAP-Config-Relay (for Relay UE) is received from a remote UE and it is not the first SRAP data PDU received from the remote UE via SL-RLC1, the SRAP entity shall:
- discard the received SRAP Data PDU.

---

Alternatively, the U2N Relay UE could make sure a sl-SRAP-Config-Relay for the remote UE has been received from gNB or configured by gNB before delivery of SRAP Data Packet(s)/PDU(s) of the remote UE from the receiving part of SRAP entity on PC5 interface of the U2N Relay UE to the transmitting part of SRAP entity on Uu interface of the U2N Relay UE.

The U2N Relay UE may receive and store a (very first) SRAP Data PDU received from a remote UE before the U2N Relay UE receives a relay operation configuration (e.g. sl-SRAP-Config-Relay) for the remote UE from gNB. The U2N Relay UE should not deliver the (very first) SRAP Data PDU from the receiving part of SRAP entity on PC5 interface to the transmitting part of SRAP entity on Uu interface before the relay operation configuration for the remote UE is received or configured. The U2N Relay UE could deliver the (very first) SRAP Data PDU from the receiving part of SRAP entity on PC5 interface to the transmitting part of SRAP entity on Uu interface when/if/ after the relay operation configuration for the remote UE is received or configured. Or, the U2N Relay UE could deliver the (very first) SRAP Data PDU from the receiving part of SRAP entity on PC5 interface to the transmitting part of SRAP entity on Uu interface in response to reception of the relay operation configuration for the remote UE. Or, the U2N Relay UE could deliver the (very first) SRAP Data PDU from the receiving part of SRAP entity on PC5 interface to the transmitting part of SRAP entity on Uu interface when/if/after the relay operation configuration for the remote UE is available on the U2N Relay UE.

More specifically, the relay operation configuration could be sl-SRAP-Config-Relay. The sl-SRAP-Config-Relay could include a sl-LocalIdentity of the remote UE and sl-MappingToAddModList.

More specifically, the (very first) SRAP Data PDU could be received via SL-RLC1. The (very first) SRAP Data PDU could include the remote UE's SRB1 message. The SRB1 message could be RRCReconfigurationComplete message.

For this alternative, an exemplary text proposal could be as follows:

---
5.3.2 Receiving operation of U2N Relay UE

Upon receiving an SRAP Data Packet from lower layer, the receiving part of the SRAP entity on the PC5 interface shall:
- deliver the SRAP Data Packet to the transmitting part of the collocated SRAP entity after receiving SL-L2RelayUEConfig including the Layer-2 ID of the remote UE from which the SRAP Data packet is received.
---

Another exemplary text proposal could be as follows:

---
5.3.2 Receiving operation of U2N Relay UE

Upon receiving an SRAP Data Packet from lower layer, the receiving part of the SRAP entity on the PC5 interface shall:
- deliver the SRAP Data Packet to the transmitting part of the collocated SRAP entity if SRAP parameters of the remote UE, from which the SRAP Data packet is received, has been or is configured.
---

An additional exemplary text proposal could be as follows:

---
5.3.2 Receiving operation of U2N Relay UE

Upon receiving an SRAP Data Packet from lower layer, the receiving part of the SRAP entity on the PC5 interface shall:
- deliver the SRAP Data Packet to the transmitting part of the collocated SRAP entity if or when SL-L2RelayUEConfig, including the Layer-2 ID of the remote UE from which the SRAP Data packet is received, is received.
---

Figure 19:
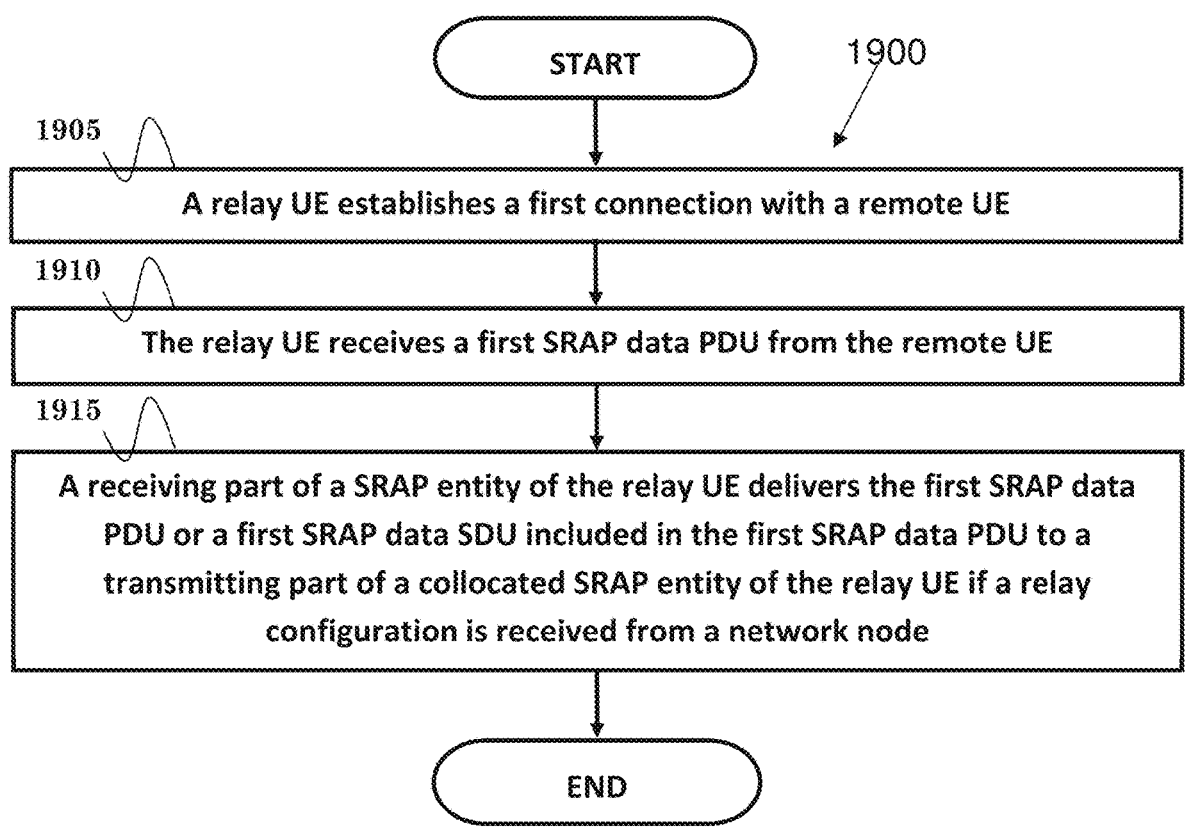
FIG. 19 is a flow diagram according to one exemplary embodiment.

FIG. 19 is a flow chart 1900 illustrating a method for forwarding SRAP data packet. In step 1905, a relay UE establishes a first connection with a remote UE. In step 1910, the relay UE receives a first SRAP data PDU from the remote UE. In step 1915, a receiving part of a SRAP entity of the relay UE delivers the first SRAP data PDU or a first SRAP data SDU included in the first SRAP data PDU to a transmitting part of a collocated SRAP entity of the relay UE if a relay configuration is received from a network node.

In one embodiment, the relay UE could establish a second connection with the network node. The relay UE could transmit a first RRC message to the network node, wherein the first RRC message indicates the network node to allocate a local ID of the remote UE. The relay UE could receive a second RRC message from the network node, wherein the second RRC message includes the relay configuration, and wherein the relay configuration contains the local ID of the remote UE. The relay UE could transmit a second SRAP data PDU to the network node, wherein the second SRAP data PDU includes the first SRAP data SDU and the local ID of the remote UE.

In one embodiment, the first connection may be a layer-2 link, a PC5-S connection or a PC5-RRC connection. The second connection may be a Uu RRC connection. The first RRC message may include a L2ID of the remote UE. The relay configuration may be a SL-L2RelayUEConfig. The relay configuration may include the L2ID of the remote UE and a SRAP configuration associated with the L2ID of the remote UE. The SRAP configuration may include sl-LocalIdentity of the remote UE.

In one embodiment, the network node may be a base station or gNB. The first SRAP data PDU could be received via SL-RLC0 or SL-RLC1. The relay UE could be in RRC_IDLE or RRC_INACTIVE when the relay UE receives the first SRAP data PDU from the remote UE. The relay UE could be in RRC_CONNECTED when the relay UE transmits the second SRAP data PDU to the network node.

In one embodiment, the first RRC message may be a SidelinkUEInformationNR message. The second RRC message may be a RRCReconfiguration message. The SRAP configuration may be sl-SRAP-Config-Relay. The sl-LocalIdentity of the remote UE could be used to set the local ID of the remote UE.

Referring back to FIGS. 3 and 4, in one exemplary embodiment of a relay UE, the relay UE 300 includes a program code 312 stored in the memory 310. The CPU 308 could execute program code 312 to enable the relay UE (i) to establish a first connection with a remote UE, (ii) to receive a first SRAP data PDU from the remote UE, and (iii) to deliver, by a receiving part of a SRAP entity of the relay UE, the first SRAP data PDU or a first SRAP data SDU included in the first SRAP data PDU to a transmitting part of a collocated SRAP entity of the relay UE if a relay configuration is received from a network node. Furthermore, the CPU 308 can execute the program code 312 to perform all of the above-described actions and steps or others described herein.

Figure 20:
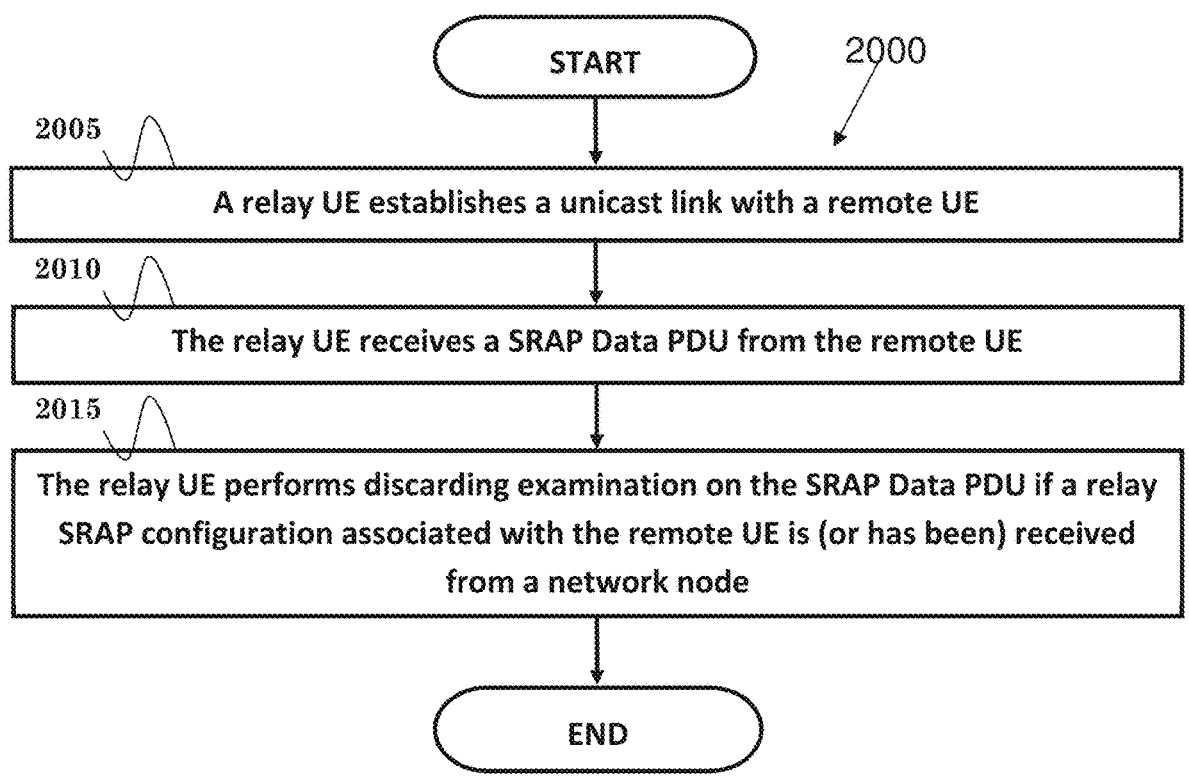
FIG. 20 is a flow diagram according to one exemplary embodiment.

FIG. 20 is a flow chart 2000 illustrating a method for SRAP Data PDU discarding. In step 2005, the relay UE establishes a unicast link with a remote UE. In step 2010, the relay UE receives a SRAP Data PDU from the remote UE. In step 2015, the relay UE performs discarding examination on the SRAP Data PDU if a relay SRAP configuration associated with the remote UE is (or has been) received from a network node.

In one embodiment, the relay UE could establish a RRC connection with the network node in response to reception of the SRAP Data PDU from the remote UE. The relay UE could transmit a Sidelink UE information message to the network node to request provision of the relay SRAP configuration. The relay UE could discard the SRAP Data PDU if a UE ID included in the SRAP Data PDU does not match any sl-LocalIdentity included in the relay SRAP configuration. The relay UE could discard the SRAP Data PDU if a BEARER ID included in the SRAP Data PDU does not match any sl-RemoteUE-RB-Identity included in the relay SRAP configuration.

In one embodiment, the relay UE could transmit a SRAP Data SDU included in the SRAP Data PDU to the network node if the SRAP Data PDU is not discarded. The relay SRAP configuration could be (or could include) a sl-SRAP-Config-Relay. The relay SRAP configuration could be included in a RRC Reconfiguration message transmitted by the network node. The RRC Reconfiguration message could include a Layer-2 ID of the remote UE. The SRAP Data PDU could be the first SRAP Data PDU received on SL-RLC1.

In one embodiment, the relay UE may be in RRC_IDLE or RRC_INACTIVE when the SRAP Data PDU is received from the remote UE. The network node may be a base station or gNB.

Referring back to FIGS. 3 and 4, in one exemplary embodiment of a relay UE, the relay UE 300 includes a program code 312 stored in the memory 310. The CPU 308 could execute program code 312 to enable the relay UE (i) to establish a unicast link with a remote UE, (ii) to receive a SRAP Data PDU from the remote UE, and (iii) to perform discarding examination on the SRAP Data PDU if a relay SRAP configuration associated with the remote UE is (or has been) received from a network node. Furthermore, the CPU 308 can execute the program code 312 to perform all of the above-described actions and steps or others described herein.

According to 3GPP R2-220wyz (running CR of TS 38.300), the relay UE may be in RRC_IDLE or RRC_INACTIVE during the Remote UE connection establishment procedure. In response to reception of the first message i.e. RRCSetupRequest (included in a SRAP Data Packet) from a L2 U2N Remote UE via SL-RLC0, the relay UE initiates the RRC connection establishment procedure (if the relay UE is in RRC_IDLE) or the RRC connection resume procedure (if the relay UE is in RRC_INACTIVE) toward gNB. After the relay UE enters RRC_CONNECTED, the relay UE sends a SidelinkUEInformationNR message to gNB for requesting allocation of a local ID for the L2 U2N Remote UE, and gNB then responds with a RRCReconfiguration message including the sl-RemoteUE-ToAddModList.

Because the SRAP sublayer is not present over PC5 hop for L2 U2N Remote UE's message on SRB0 (as specified in 3GPP R2-220wyz, running CR of TS 38.300), the SRAP Data PDU discarding examination mentioned above will be skipped (i.e. not performed) for a SRAP Data PDU received via SL-RLC0. Therefore, the relay UE will deliver the received SRAP Data Packet from the receiving part of the SRAP entity on the PC5 interface to the transmitting part of the collocated SRAP entity on the Uu interface when the SRAP Data Packet is received, and then the transmitting part of the collocated SRAP entity will determine the UE ID field of the SRAP Data PDU based on the sl-RemoteUE-ToAddModList.

When determining the UE ID field, the SARP entity in the U2N Relay UE checks the sl-RemoteUE-ToAddModList to see if any entry in the sl-RemoteUE-ToAddModList includes a sl-L2Identity-Remote which matches the Layer-2 ID of the remote UE from which the SRAP Data packet is received. If a sl-L2Identity-Remote of an entry in sl-RemoteUE-ToAddModList matches the remote UE's Layer-2 ID, the sl-LocalIdentity of the entry is used to set the UE ID field. And, the BEARER ID field is set to 0. In case the relay UE in RRC_IDLE/INACTIVE should firstly initiates a RRC connection establishment procedure or a RRC connection resume procedure toward gNB to enter RRC_CONNECTED and then sends a SidelinkUEInformation message to gNB to request the local ID of the U2N Remote UE, the current sl-RemoteUE-ToAddModList configured in the relay UE would not include any entry with a sl-L2Identity-Remote matching the remote UE's Layer-2 ID when the SRAP Data PDU is received by (the transmitting part of the SRAP entity on the Uu interface of) the relay UE.

Thus, the relay UE would fail to determine the UE ID field of the SRAP Data PDU. As a result, the behaviour of the relay UE would be undefined in this situation according to subclause 5.3.3.1 of 3GPP R2-2203947. It is possible that the relay UE may discard the SRAP Data Packet of the U2N Remote UE. Since the SRAP Data Packet of the U2N Remote UE includes the U2N Remote UE's SRB0 message (i.e. RRCSetupRequest) used for request of RRC connection establishment between the U2N Remote UE and gNB (via the U2N Relay UE), not forwarding the RRCSetupRequest message to gNB successfully would cause the RRC connection establishment failure for the U2N Remote UE. Even if the relay UE is in RRC_CONNECTED, the relay UE still needs to send a SidelinkUEInformation message to gNB to request the local ID of the U2N Remote UE. Thus, this issue also exists for the relay UE is in RRC_CONNECTED.

To solve the above issue, one potential solution is for the U2N Relay UE to repeat the UE ID and BEARER ID field determination if there is no entry in the current sl-RemoteUE-ToAddModList with a sl-L2Identity-Remote matching the remote UE's Layer-2 ID. An exemplary text proposal on subclause 5.3.3.1 of 3GPP R2-2203947 may be as follows:

---

5.3.3.1 UE ID and BEARER ID field determination

For an SRAP Data SDU received from SL-RLC0 as specified in TS 38.331 [3], the SRAP entity shall:
- if there is an entry in sl-RemoteUE-ToAddModList, whose sl-L2Identity-Remote matches the Layer-2 ID of the remote UE from which the SRAP Data packet is received,
  - Determine the UE ID corresponding to sl-LocalIdentity configured for the concerned sl-L2Identity-Remote as specified in TS 38.331 [3];
  - Determine the BEARER ID as 0 (i.e., set BEARER ID field as 0), configured as specified in TS 38.331 [3];
- else:
  - repeat the UE ID and BEARER ID field determination for SRAP Data SDU;

---

It is also feasible for the relay UE to start a timer (e.g. Txxx) for determining when to perform transmitting operation (which includes the UE ID and BEARER ID field determination) by the transmitting part of the SRAP entity on the Uu interface, when the SRAP Data PDU is received by the relay UE, by the receiving part of the SRAP entity on the PC5 interface, or by the transmitting part of the SRAP entity on the Uu interface. This timer is stopped when a sl-RemoteUE-ToAddModList including an entry with a sl-L2Identity-Remote matching the remote UE's Layer-2 ID is received from gNB. The (transmitting part of the SRAP entity on the Uu interface of the) relay UE may perform the UE ID and BEARER ID field determination if this timer is not running. This timer may be associated with the remote UE from which the SRAP Data PDU is received.

Alternatively, this timer may be started when the relay UE transmits SidelinkUEInformation message to gNB to request the local ID of the U2N Remote UE.

An exemplary text proposal on subclause 5.3.3 of 3GPP R2-2203947 may be as follows:

---

5.3.3 Transmitting operation of U2N Relay UE

The transmitting part of the SRAP entity on the Uu interface of U2N Relay UE can receive SRAP Data Packets from the receiving part of the SRAP entity on the PC5 interface of the same U2N Relay UE, and construct SRAP Data PDUs as needed (see clause 4.2.2).
If a SRAP Data packet of a remote UE is received from the collocated SRAP entity and Txxx for the remote UE is not running, the transmitting part of the SRAP entity on the Uu interface shall:
- if the SRAP Data packet is received from SL-RLC0 as specified in TS 38.331 [3]:
  - Determine the UE ID and BEARER ID field in accordance with clause 5.3.3.1, for SRAP Data packet;
  - Construct an SRAP Data PDU by adding an SRAP header to the SRAP SDU, where the UE ID field and BEARER ID field is set to the determined value, in accordance with clause 6.2.2, for SRAP Data packet;
- Determine the egress RLC channel in accordance with clause 5.3.3.2;
- Submit this SRAP Data PDU to the determined egress RLC channel.

---

Similar to the alternative as mentioned above, it is also possible that the U2N Relay UE could make sure a sl-RemoteUE-ToAddModList including the remote UE's L2ID has been received from gNB or configured by gNB before delivery of SRAP Data Packet/PDU (including the RRC-SetupRequest message of the remote UE) from the receiving part of SRAP entity on PC5 interface of the U2N Relay UE to the transmitting part of SRAP entity on Uu interface of the U2N Relay UE. More specifically, the SRAP Data Packet/PDU (including the RRCSetupRequest message of the remote UE) could be received via SL-RLC0.

Figure 21:
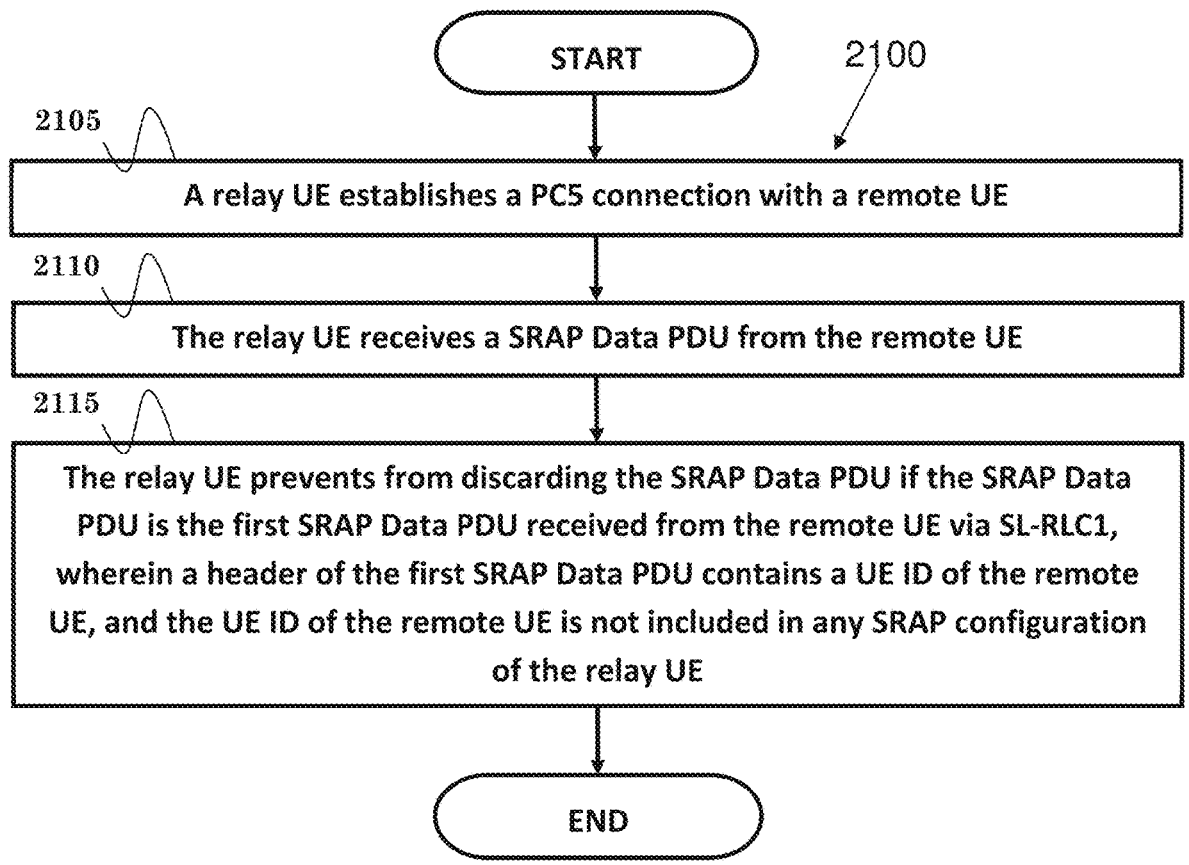
FIG. 21 is a flow diagram according to one exemplary embodiment.

FIG. 21 is a flow chart 2100 illustrating a method for SRAP Data PDU discarding. In step 2105, a relay UE establishes a PC5 connection with a remote UE. In step 2110, the relay UE receives a SRAP Data PDU from the remote UE. In step 2115, the relay UE prevents from discarding the SRAP Data PDU if the SRAP Data PDU is the first SRAP Data PDU received from the remote UE via SL-RLC1, wherein a header of the first SRAP Data PDU contains a UE Identity/Identifier (ID) of the remote UE, and the UE ID of the remote UE is not included in any SRAP configuration of the relay UE.

In one embodiment, there may be no SRAP configuration associated with the remote UE maintained in the relay UE when the first SRAP Data PDU is received from the remote UE via SL-RLC1.

In one embodiment, the relay UE could receive a SRAP configuration associated with the remote UE from a network node after the first SRAP Data PDU is received from the remote UE, wherein the SRAP configuration configures the UE ID of the remote UE to the relay UE. The SRAP configuration may be a sl-SRAP-Config-Relay.

In one embodiment, the relay UE may be in RRC_IDLE or RRC_INACTIVE when the SRAP Data PDU is received from the remote UE. The SRAP Data PDU may include a RRCReconfigurationComplete message of the remote UE.

Referring back to FIGS. 3 and 4, in one exemplary embodiment of a relay UE, the relay UE 300 includes a program code 312 stored in the memory 310. The CPU 308 could execute program code 312 to enable the relay UE (i) to establish a PC5 connection with a remote UE, (ii) to receive a SRAP Data PDU from the remote UE, and (iii) to prevent from discarding the SRAP Data PDU if the SRAP Data PDU is the first SRAP Data PDU received from the remote UE via SL-RLC1, wherein a header of the first SRAP Data PDU contains a UE ID of the remote UE, and the UE ID of the remote UE is not included in any SRAP configuration of the relay UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for Sidelink Relay Adaptation Protocol (SRAP) Data Protocol Data Unit (PDU) discarding, comprising:
   a relay User Equipment (UE) establishes a PC5 connection with a remote UE;
   the relay UE receives a SRAP Data PDU from the remote UE; and
   the relay UE prevents from discarding the SRAP Data PDU if the SRAP Data PDU is the first SRAP Data PDU received from the remote UE via Sidelink-Radio Link Control1 (SL-RLC1), wherein a header of the first SRAP Data PDU contains a UE Identity/Identifier (ID) of the remote UE, and the UE ID of the remote UE is not included in a SRAP configuration of the relay UE.

2. The method of claim 1, wherein there is no SRAP configuration associated with the remote UE maintained in the relay UE when the first SRAP Data PDU is received from the remote UE via SL-RLC1.

3. The method of claim 1, further comprising:
   the relay UE receives a SRAP configuration associated with the remote UE from a network node after the first SRAP Data PDU is received from the remote UE, wherein the SRAP configuration configures the UE ID of the remote UE to the relay UE.

4. The method of claim 3, wherein the SRAP configuration is a relay SRAP configuration (sl-SRAP-Config-Relay).

5. The method of claim 1, wherein the relay UE is in a Radio Resource Control (RRC) IDLE state (RRC_IDLE) or an RRC_INACTIVE state (RRC_INACTIVE) when the SRAP Data PDU is received from the remote UE.

6. The method of claim 1, wherein the SRAP Data PDU includes a Radio Resource Control reconfiguration complete (RRCReconfigurationComplete) message of the remote UE.

7. A relay User Equipment (UE), comprising:
   a control circuit;
   a processor installed in the control circuit; and
   a memory installed in the control circuit and operatively coupled to the processor;
   wherein the processor is configured to execute a program code stored in the memory to:
      establish a PC5 connection with a remote UE;
      receive a Sidelink Relay Adaptation Protocol (SRAP) Data Protocol Data Unit (PDU) from the remote UE; and
      prevent from discarding the SRAP Data PDU if the SRAP Data PDU is the first SRAP Data PDU received from the remote UE via Sidelink-Radio Link Control1 (SL-RLC1), wherein a header of the first SRAP Data PDU contains a UE Identity/Identifier (ID) of the remote UE, and the UE ID of the remote UE is not included in a SRAP configuration of the relay UE.

8. The relay UE of claim 7, wherein there is no SRAP configuration associated with the remote UE maintained in the relay UE when the first SRAP Data PDU is received from the remote UE via SL-RLC1.

9. The relay UE of claim 7, wherein the processor is further configured to execute a program code stored in the memory to:
   receive a SRAP configuration associated with the remote UE from a network node after the first SRAP Data PDU is received from the remote UE, wherein the SRAP configuration configures the UE ID of the remote UE to the relay UE.

10. The relay UE of claim 9, wherein the SRAP configuration is a relay SRAP configuration (sl-SRAP-Config-Relay).

11. The relay UE of claim 7, wherein the relay UE is in a Radio Resource Control (RRC) IDLE state (RRC_IDLE) or an RRC_INACTIVE state (RRC_INACTIVE) when the SRAP Data PDU is received from the remote UE.

12. The relay UE of claim 7, wherein the SRAP Data PDU includes a Radio Resource Control (RRC) reconfiguration complete (RRCReconfigurationComplete) message of the remote UE.

* * * * *